US012710354B2

(12) United States Patent
Pleitez Rafael et al.

(10) Patent No.: US 12,710,354 B2
(45) Date of Patent: Aug. 18, 2026

(54) DEVICE AND METHOD FOR DETERMINING PARAMETERS REGARDING A CONTENT OR PROPERTY OF BIOMOLECULES IN BIOLOGICAL TISSUES

(71) Applicant: Helmholtz Zentrum München Deutsches Forschungszentrum für Gesundheit und Umwelt (GmbH), Neuherberg (DE)

(72) Inventors: Miguel Angel Pleitez Rafael, Munich (DE); Vasilis Ntziachristos, Munich (DE)

(73) Assignee: Helmholtz Zentrum München Deutsches Forschungszentrum Für Gesundheit und Umwelt (GmbH), Neuherberg (DE)

( * ) Notice: Subject to any disclaimer, the term of this patent is extended or adjusted under 35 U.S.C. 154(b) by 247 days.

(21) Appl. No.: 18/580,063

(22) PCT Filed: Jul. 22, 2022

(86) PCT No.: PCT/EP2022/070644
§ 371 (c)(1),
(2) Date: Jan. 17, 2024

(87) PCT Pub. No.: WO2023/002024
PCT Pub. Date: Jan. 26, 2023

(65) Prior Publication Data

US 2024/0241039 A1 Jul. 18, 2024

(30) Foreign Application Priority Data

Jul. 23, 2021 (EP) .................................... 21187404

(51) Int. Cl.
*G01N 21/17* (2006.01)

(52) U.S. Cl.
CPC . *G01N 21/1702* (2013.01); *G01N 2201/0221* (2013.01); *G01N 2291/02475* (2013.01)

(58) Field of Classification Search
CPC ........... G01N 29/2418; G01N 21/1702; G01N 29/0681; G01N 2291/02475;
(Continued)

(56) References Cited

U.S. PATENT DOCUMENTS

| | | | | |
|---|---|---|---|---|
| 5,941,821 A * | 8/1999 | Chou | A61B 5/0095 | |
| | | | 374/45 | |
| 10,314,494 B2 * | 6/2019 | Sato | A61B 5/0095 | |
| 2021/0307615 A1 * | 10/2021 | Schwarz | G01J 3/1256 | |

FOREIGN PATENT DOCUMENTS

| | | |
|---|---|---|
| EP | 3521808 A1 | 8/2019 |
| WO | 2019170716 A1 | 9/2019 |

OTHER PUBLICATIONS

European Search Report dated Jan. 27, 2022 issued in European patent application No. 21187404.5.

(Continued)

*Primary Examiner* — Igor N Borissov
(74) *Attorney, Agent, or Firm* — Dorsey & Whitney LLP

(57) ABSTRACT

This disclosure relates to a device and a method for determining one or more parameters regarding a content or property of biomolecules, in particular metabolites, in a biological tissue. The device comprises at least one irradiation unit, at least one detection unit, and a processing unit.

18 Claims, 3 Drawing Sheets

Figure 1:
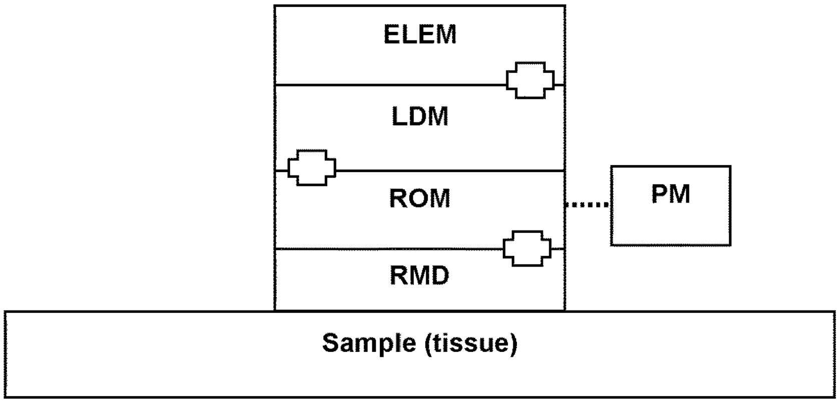

(58) Field of Classification Search
CPC ........ G01N 2201/0221; A61B 5/14546; A61B 5/0095; A61B 2562/0204
USPC .......................................................... 600/300
See application file for complete search history.

(56) References Cited

OTHER PUBLICATIONS

International Search Report and Written Opinion dated Oct. 5, 2022 issued in international patent application No. PCT/EP2022/070644.
Karlas Angelos et al., “Optoacoustic imaging in endocrinology and metabolism”, Nature Reviews, Endocrinology, Nature Publ. Group, US, vol. 17, No. 6, Apr. 19, 2021, pp. 323-335.
Pleitez, Miguel et al., “Label-free metabolic imaging by mid-infrared optoacoustic microscopy in living cells”, Nature Biotechnology, Nature Publishing Group US, New York, Vo. 38, No. 3, Dec. 23, 2019, pp. 293-296.

* cited by examiner

DEVICE AND METHOD FOR DETERMINING PARAMETERS REGARDING A CONTENT OR PROPERTY OF BIOMOLECULES IN BIOLOGICAL TISSUES

RELATED APPLICATIONS

This patent application is a U.S. National Stage filing under 35 U.S.C. 371 of International Patent Application No. PCT/EP2022/070644, titled "DEVICE AND METHOD FOR DETERMINING PARAMETERS REGARDING A CONTENT OR PROPERTY OF BIOMOLECULES IN BIOLOGICAL TISSUES," filed Jul. 22, 2022, which claims priority to European Patent Application No. 21187404.5, filed Jul. 23, 2021, each of which is incorporated herein by reference in its entirety.

The present invention relates to a device and method for determining one or more parameters regarding a content, e.g. a concentration and/or spatial distribution, and/or property, e.g. an optical absorption spectrum, of biomolecules, in particular metabolites, in a biological tissue.

Accurate measurement of metabolic-relevant parameters such as glucose, lactate, hydration, lipid levels, etc. is of prime importance for management and prevention of complications in several metabolic diseases (such as diabetes and obesity). Furthermore, it is also important for assessing performance in sports, recreational activities, and as general indicator of health status. Ideally metabolic monitoring should be performed continuously by a portable device. However, current blood glucose measurement devices are invasive and require blood extraction, a procedure that is impractical for continuous glucose monitoring as it is associated with pain and risk of infections.

It is an object of the invention to provide an improved device and method for, in particular continuously and/or non-invasively, determining one or more parameters regarding a content and/or property of biomolecules, in particular metabolites, in a biological tissue.

According to a first aspect of present disclosure, a device for determining one or more parameters regarding a content and/or property of biomolecules, in particular metabolites, in a biological tissue comprises: at least one irradiation unit configured to irradiate the tissue with electromagnetic radiation exhibiting one or more wavelengths or wavelength ranges, in particular in the mid-infrared (mid-IR), near-infrared (near-IR) and/or visible spectral range; at least one detection unit configured to detect, in a spatially resolved manner, first signals corresponding to optical and/or optoacoustic and/or optothermal signals emanating from the tissue in response to irradiating the tissue with electromagnetic radiation, in particular at a first time or period and/or at one or more wavelengths or wavelength ranges in the near-infrared and/or visible spectral range, wherein the at least one irradiation unit and the at least one detection unit are located in the same half space above and/or adjacent to the irradiated tissue; and a processing unit configured i) to localize, based on the detected first signals, a location or region of interest on and/or within the tissue, at which at least one biomolecule of interest is present or expected, ii) to control the at least one irradiation unit to irradiate, in particular at a second time or period, the location or region of interest on and/or within the tissue with electromagnetic radiation exhibiting a time-varying intensity and one or more wavelengths or wavelength ranges in the mid-infrared spectral range, iii) to control the at least one detection unit to detect second signals corresponding to optoacoustic and/or optothermal signals emanating from the irradiated location or region of interest on and/or within the tissue in response to irradiating the location or region of interest on and/or within the tissue with the electromagnetic radiation exhibiting the time-varying intensity and the one or more wavelengths or wavelength ranges in the mid-infrared spectral range, and iv) to determine, based on the detected second signals, one or more parameters regarding a content and/or property of the at least one biomolecule of interest at the location or region of interest on and/or within in the tissue.

According to a second aspect of present disclosure, a method for determining one or more parameters regarding a content and/or property of biomolecules, in particular metabolites, in a biological tissue comprises the following steps: irradiating, in particular at a first time or period, the tissue with electromagnetic radiation exhibiting one or more wavelengths or wavelength ranges, in particular in the near-infrared and/or visible spectral range; detecting, in a spatially resolved manner, first signals corresponding to optical and/or optoacoustic and/or optothermal signals emanating from the tissue in response to irradiating the tissue with the electromagnetic radiation; localizing, based on the detected first signals, a location or region of interest on and/or within the tissue, at which at least one biomolecule of interest is present or expected; irradiating, in particular at a second time or period, the location or region of interest on and/or within the tissue with electromagnetic radiation exhibiting a time-varying intensity and one or more wavelengths or wavelength ranges in the mid-infrared spectral range; detecting second signals corresponding to optoacoustic and/or optothermal signals emanating from the irradiated location or region of interest on and/or within the tissue in response to irradiating the location or region of interest on and/or within the tissue with the electromagnetic radiation exhibiting the time-varying intensity and the one or more wavelengths or wavelength ranges in the mid-infrared spectral range; and determining, based on the detected second signals, one or more parameters regarding a content and/or property of the at least one biomolecule of interest at the location or region of interest on and/or within in the tissue.

A third aspect of present disclosure relates to a computer program product which, when being executed by a computer, causes the computer to carry out the steps of the method according to the second aspect.

A fourth aspect of present disclosure relates to a computer-readable storage medium comprising instructions which, when executed by a computer, cause the computer to carry out the steps of the method according to the second aspect.

Preferably, the computer can be any device or system for electronic data processing, including smart phones, smart watches, smartwear, wearable devices, and/or fitness watches.

Aspects of present disclosure are preferably based on the approach of localizing, also referred to as "identifying", "selecting" or "pre-selecting", one or more locations or regions of interest on or in the tissue prior to measuring and/or determining metabolite parameters, in particular concentrations, at the one or more pre-selected locations or regions of interest using mid-infrared radiation.

Preferably, within the context of present disclosure, the terms "localizing", "identifying", "selecting" and "pre-selecting" (and any variations thereof) with reference to locations or regions of interest are preferably to be understood as finding or determining the position(s) of locations or regions of interest on or in the tissue. For example, localizing a location of interest on or in the tissue includes determining the coordinate(s), i.e. at least one of x, y and/or z, of the location of interest.

Preferably, within the context of present disclosure, the terms "measuring" and "determining" (and any variations thereof) with reference to a content and/or a property or parameters regarding a content and/or a property of at least one biomolecule are preferably understood as quantitatively measuring or determining, respectively, the content, e.g. a concentration, and/or property of the at least one biomolecule in the tissue.

Preferably, identification of structures, locations or regions of interest on or in the tissue can be achieved, e.g., by a camera which is configured to capture still or moving images of the tissue in the visible, near-infrared or mid-infrared spectrum, wherein the at least one irradiation unit is configured to irradiate the tissue with electromagnetic radiation in the visible, near-infrared or mid-infrared spectral range, respectively. Alternatively or additionally, the identification of structures, locations or regions of interest on or in the tissue can be achieved, e.g., by a single detector, which is scanned over the tissue by means of a scanning unit, or a detector with parallel channels so as to collect visible, near-infrared or mid-infrared signals emanating from different locations of the tissue. Alternatively or additionally, the detected signals emanating from the tissue can comprise and/or can be optoacoustic and/or optothermal signals which are generated in the tissue due to an absorption of time-varying, e.g. pulsed, electromagnetic radiation and subsequent generation of acoustic waves (due to the photoacoustic effect) or thermal radiation, respectively. In each case, the at least one detection unit comprising a camera or detector(s), respectively, detects, in a spatially resolved manner, first signals corresponding to optical (e.g. visible, near-IR or mid-IR) and/or optoacoustic and/or optothermal signals emanating from the tissue in response to irradiating the tissue with the electromagnetic radiation.

Based on the first signals, the device and/or method preferably first seeks for metabolic relevant positions, also referred to as location(s) of interest (LOI) or region(s) of interest (ROI), in the tissue (e.g. blood vessels, stratum spinosum, etc.), in distinction to metabolic irrelevant positions and/or interfering structures (e.g. stratum corneum, water/fat cumuli, etc.).

For example, by irradiating the tissue with electromagnetic radiation at 532 nm (visible) and/or 1064 nm (near-infrared) and spatially-resolved detecting the first signals corresponding to optical signals (electromagnetic radiation) emanating from the irradiated tissue, the first signals contain spatially resolved information about the absorption properties of the tissue at the mentioned wavelength(s) and, therefore, allow for determining positions above and/or within blood-containing structures (e.g microvasculature), for example by determining the positions where the first signals are below a predetermined signal value or, respectively, where the corresponding absorption exceeds a predetermined absorption value.

In this way, metabolites, optimal measurement parameters and metabolite-containing structures and/or compartments can be simply and accurately localized, identified and/or selected so as to account for tissue and/or metabolic heterogeneity.

After determining the position(s) of location(s) or region(s) of interest on and/or within the tissue, the location(s) or region(s) of interest on and/or within the tissue is or are irradiated with mid-infrared radiation exhibiting a time-varying intensity, and optoacoustic and/or optothermal signals, also referred to as "second signals", generated at the location(s) or region(s) of interest on and/or within the tissue in response to an at least partial absorption of the mid-infrared radiation by the tissue are detected.

Preferably, the optoacoustic signals comprise or correspond to acoustic waves, in particular ultrasound waves. Preferably, the optothermal signals comprise or correspond to thermal radiation.

Based on the detected second signals, preferably only on second signals which were obtained from the location(s) or region(s) of interest on and/or within the tissue, one or more parameters regarding a content and/or property of at least one biomolecule of interest, in particular a metabolic parameter or metabolism-related parameter such as glucose, lactate, hydration and/or lipid levels, at the location(s) or region(s) of interest on and/or within in the tissue is determined.

The irradiation of the tissue and detection of the first signals emanating from the irradiated tissue and/or the irradiation (excitation) of the tissue and detection of the second signals emanating from the irradiated tissue is preferably performed in a so-called "reflection geometry" or epi-illumination mode, wherein the at least one irradiation unit and the at least one detection unit are located in the same half space above and/or adjacent to the irradiated tissue. In this way, non-invasive applications of the sensor device and/or method are enabled in a simple and reliable way.

In summary, the invention provides an improved device and method for, in particular selective, non-invasive and continuous, determination of one or more parameters regarding a content and/or property of biomolecules, in particular metabolites, in a biological tissue.

Within the context of present disclosure, the mid-infrared (mid-IR) spectral range preferably covers wavelengths from approx. 3 μm to approx. 1 mm, preferably wavelengths from 3 μm to 16 μm, in particular from 3 μm to 12 μm or from 3 μm to 8 μm.

Within the context of present disclosure, the mid-Infrared spectral range preferably covers one or more wavelengths or wavelength ranges which are suited to trigger specific molecular vibrational and/or radiative transitions of biomolecules, in particular metabolites such as glucose, lactate, hydration and/or lipid, contained in the biological tissue.

Within the context of present disclosure, the near-infrared (NIR) spectral range covers wavelengths from approx. 0.75 μm to 3 μm, in particular from 0.75 μm to 1.4 μm or from 1 μm to 1.4 μm.

Within the context of present disclosure, the short-infrared (SWIR) spectral range covers wavelengths from approx. 1 μm to 3 μm, in particular from 1.4 μm to 3 μm or from 1 μm to 2 μm.

Within the context of present disclosure, the visible spectral range covers wavelengths from approx. 380 nm to 750 nm.

Preferably, the at least one irradiation unit comprises at least one laser, e.g. a quantum cascade laser (QCL), interband cascade lasers (ICL), laser diode and/or diode laser, or a laser array comprising such lasers.

Preferably, the at least one detection unit comprises at least one detector which is configured to detect, in a spatially resolved manner, the signals emanating from the tissue. For example, the at least one detector can be or comprise an optical detector, e.g. a CCD, and/or a camera and/or an acoustic transducer, e.g. a piezoelectric transducer, or an array of acoustic transducers and/or a thermal detector, e.g. a bolometer or pyrometer, or an array of thermal detectors for detecting thermal radiation. The type of detector(s) used depends on the tissue's response (e.g. reflected or scattered light, optoacoustic waves, thermal radiation and/or temperature change) which is to be detected in response to irradiating the tissue with electromagnetic radiation in a given spectral range (e.g. visual, NIR, SWIR and/or mid-IR) and/or with a given spectral content and/or a given time behavior (e.g. constant, transient or time-varying properties, e.g. pulses).

Preferably, the device is designed as and/or is integrated in a portable and/or wearable device having a size, weight and/or form factor allowing the device to be carried and/or worn by a person. For example, the device is designed for being worn at the wrist and/or another part, e.g. on an upper arm, earlobe, or the anywhere on the skin, of a human. Alternatively, it is also possible to design only a first part or first components of the device so as to be attached to and/or worn by a human, whereas the remaining second part or second components of the device is or are configured to remain stationary, wherein a preferably wireless data communication is provided which is configured to transmit data and/or commands between the wearable first part or components and the stationary second part or components. Preferably, size and weight of the device are reduced, in particular minimized, by integrating at least a part and/or some of the components, which are provided for optical excitation, light delivery, detection, and signal read-out and/or signal processing, on infrared and/or visible on-substrate-grown lasers and waveguides, for instance silicon-on-isolator waveguides, germanium-on-insulator waveguides, silicon-germanium-on-insulator waveguides, on-silicon grown laser arrays and/or substrate-emitting ring lasers. Preferably, integrated light-emitting elements, preferably quantum cascade lasers, interband cascade lasers, laser diodes and/or diode lasers, are used, which preferably share the same heat management and electronics. For example, arrays of these emission elements can be printed, grown, deposited, and/or allocated in a common substrate to minimize spatial separation among emitting elements by, for instance, on-silicon grown laser arrays and/or substrate-emitting rings.

Preferably, the device is configured for non-invasively determining the one or more parameters regarding the content and/or property of biomolecules, in particular metabolites, in the biological tissue. This is preferably achieved by combining the reflection geometry or epi-illumination mode, wherein the at least one irradiation unit and the at least one detection unit are located in the same half space above and/or adjacent to the irradiated tissue, with the use of electromagnetic radiation for non-invasive excitation (also referred to as "excitation beam" in the description below) of the tissue and, in some embodiments, non-invasive reading by means of a "probe beam" (as will be further described below) the tissue's response to the excitation. Likewise, in case that optoacoustic and/or optothermal signals are excited in the tissue, same can be non-invasively detected by acoustic, optical, or thermal detectors. Advantageously, rather than requiring blood extraction and analysis, the device and method allow for measuring and/or monitoring metabolites in various applications, such as day-to-day personal health self-care and sports.

Preferably, the at least one detection unit comprises: at least one sensitive element located so as to be close to or in contact with the tissue and configured to change at least one of its properties, in particular refractive index, temperature, reflectivity and/or polarizing properties, when interacting with the first signals or second signals emanating from the irradiated tissue or, respectively, the irradiated location or region of interest on and/or within the tissue; a probe beam source configured to generate a probe beam; a probe beam guide unit configured to guide and/or direct the probe beam towards the at least one sensitive element; and a probe beam detector configured to detect the probe beam after it has been at least partially reflected at or by the at least one sensitive element, wherein the detected probe beam corresponds to the first signals or second signals, respectively. This allows for non-invasively measuring and determining the signals or metabolic parameters, respectively, in a simple, yet reliable and precise manner.

Preferably, the sensitive element, which is also referred to as "active element" and, for instance, can be composed or made out of, completely or partially, of ZnS, Ge, Si, etc., is configured to interact with the tissue (sample) and/or the signals produced in the tissue and to thereby undergo a change in, e.g., temperature, refractive index, reflectivity, surface curvature, local pressure, polarization, electrical resistance, color, and/or any of its thermal, mechanical, chemical, optical, magnetic, electric, structural, or geometric properties. Alternatively, these changes in response to optical and/or mid-infrared excitation can also occur and be measured directly in the irradiated tissue, in which case the sample (tissue) itself is considered as the active element for detection. The sensitive element can be configured to interact with the tissue and/or signals generated therein when being in contact with the tissue. Alternatively, the sensitive element can be configured as a contactless sensitive element and/or to interact with the tissue (even) when not being in contact with the tissue. Preferably, the sensitive element can be or can be a part of a reflection-mode detector (RMD) as described in detail below.

Preferably, the probe beam guide unit comprises a coupler element configured to combine and/or co-align the probe beam with at least one beam of the electromagnetic radiation (also referred to as "excitation beam"), with which the tissue is irradiated, so that the probe beam and the at least one beam of the electromagnetic radiation impinge on the same, or essentially the same, location on the tissue. This allows for a particularly precise measurement and determination of the signals or metabolic parameters, respectively.

Preferably, the at least one detection unit comprises: at least one sensitive element located so as to be close to or in contact with the tissue and configured to change at least one of its properties, in particular refractive index, temperature, reflectivity and/or polarizing properties, when interacting with the first signals or second signals emanating from the irradiated tissue or, respectively, from the irradiated location or region of interest on and/or within the tissue; a probe beam source configured to generate a probe beam; a probe beam encoding/decoding unit configured to encode and divide the probe beam into a reference probe beam and an active probe beam, and to generate probe beam signals based on the active probe beam and the reference probe beam (e.g. based on a recombined beam and/or a separate detection of the active probe beam and reference probe beam) after having been at least partially reflected at or by the at least one sensitive element; and a probe beam guide unit configured to guide and/or direct the active probe beam and the reference probe beam towards the at least one sensitive element, wherein the probe beam guide unit comprises a coupler element configured i) to combine and/or co-align the active probe beam with at least one beam of the electromagnetic radiation, with which the tissue is irradiated, so that the active probe beam and the at least one beam of the electromagnetic radiation impinge on the same, or essentially the same, location on the tissue, and ii) to direct, in particular deflect and/or reflect, the reference probe beam to impinge on another location on the tissue, which is different and/or offset from the location on which the probe beam and the at least one beam of the electromagnetic radiation impinge. Preferably, the processing unit is configured to derive the first signals or second signals, respectively, from the probe beam signals. In this way, influences on the active probe beam signals, for example due to noise and/or from sources other than due to the interaction between the at least one sensitive element and the first or second, respectively, signals emanating from the tissue can be reduced, corrected and/or suppressed.

Preferably, the probe beam encoding/decoding unit is configured to divide the probe beam into the active probe beam and the reference probe beam and to encode the active probe beam and reference probe beam with respect to at least one physical property, in particular polarization direction and/or pattern, pulse duration, pulse repetition rate, intensity modulation and/or linewidth modulation, such that each of the active probe beam and reference probe beam has a distinctive encoding pattern. Further, the probe beam encoding/decoding unit is configured: i) to recombine, in particular by interference, the active probe beam and the reference probe beam, after having been reflected at or by the at least one sensitive element, to obtain a recombined probe beam and to detect the recombined probe beam to generate the probe beam signals, and/or ii) to separately detect the active probe beam and the reference probe beam, after having been reflected at or by the at least one sensitive element, and to derive the probe beam signals based on, in particular by subtracting and/or dividing, active probe beam signals corresponding to the detected active probe beam and reference beam signals corresponding to the detected reference probe beam. In this way, the reflected active probe beam (containing information regarding a "perturbation" of the impinging active probe beam due to the interaction between the at least one sensitive element and the first signals or second signals) can be reliably distinguished from the reflected reference probe beam ("unperturbed" but containing information on noise and/or from other sources, see above) so that a separate and/or selective detection of the reflected active probe beam and reflected reference probe beam is achieved.

Preferably, the device further comprises at least one mid-infrared light guide element configured to guide the electromagnetic radiation exhibiting one or more wavelengths or wavelength ranges in the mid-infrared spectral range from the at least one irradiation unit to the location or region of interest on and/or within the tissue, wherein the mid-infrared light guide element comprises a solid body which is entirely or at least partially composed of at least one mid-infrared transparent material, in particular ZnS, ZnSe, CaF2, Ge, Si. Unlike conventional devices and methods using a bulky inert gas or vacuum chamber, in this embodiment of the device an interference (partially or completely) from mid-infrared active atmospheric and/or external gases (water vapor, $CO_2$, alcohols, etc.) along the propagation path of the mid-infrared excitation beam is avoided or at least considerably reduced in a simple, compact and reliable way. Preferably, the at least one mid-infrared light guide element, which is also referred to as "mid-infrared light delivery element", has dimensions just enough as to allow the partial or complete transmission of the excitation beam (typically from 5 μm to 5 mm diameter) from the emission source (irradiation unit) to the excitation spot on or in the tissue. By eliminating, avoiding, or considerably reducing interference from external mid-infrared active gases in this way, it is possible to enhance light delivery efficiency and detection reproducibility, stability, and accuracy. In particular, the use of a conventional atmospheric-gas purging chamber, having dimensions several orders of magnitude larger, can be avoided so that the size of the sensing device is considerably reduced so as to enhance compactness in view of applications as a wearable and/or portable device.

Preferably, the at least one irradiation unit is configured to irradiate the tissue with at least two different types of electromagnetic radiation so as to obtain, for each of the at least two different types of electromagnetic radiation, unique optoacoustic and/or optothermal signals in response to irradiating the tissue with the at least two types of electromagnetic radiation, wherein each of the obtained optoacoustic and/or optothermal signals can be uniquely assigned to one of the at least two types of electromagnetic radiation by which the respective optoacoustic and/or optothermal signal has been caused. Preferably, the at least two different types of electromagnetic radiation differ from each other and/or are encoded with respect to at least one of the following properties of the electromagnetic radiation: polarization, pulse duration, pulse repetition rate, intensity modulation and/or linewidth modulation of the electromagnetic radiation. Providing the at least two different types of electromagnetic radiation, with which the tissue is irradiated or excited, is also referred to as "encoding" the electromagnetic radiation with respect to at least one of the aforementioned properties, e.g. polarization directions, circular or linear, pulse durations, repetition rate and/or frequency, intensity modulation and/or linewidth modulation. Since different tissues or tissue properties can have a unique response to a given encoding pattern of an impinging and/or excitation radiation, by means of encoded optical excitation it is possible to selectively generate metabolite-, tissue-, and/or depth-specific readouts. This is achieved, for example, by emitted electromagnetic radiation of one or more or each of the emitting elements to have different (fixed or changing) values of polarization directions, circular or linear, pulse durations, repetition rate and/or frequency, intensity modulation and/or linewidth modulation. That is, by means of an encoded emission, preferably a multiple-encoded emission, the selectivity and sensitivity is enhanced by creating a unique response on tissues for each emitting source. Specifically, encoded light emission allows for distinguishing readouts originating from, e.g., different emitting wavelengths, tissue locations and analytes by manipulating each emitting element of the device so that one or more of the physical parameters of the emitted light is or are modified and/or modulated in a unique manner. This is preferably done in such a way that the effect of each emitting element on tissues can be unmistakably and/or uniquely identified and/or decoded by the readout and processing modules.

Preferably, the processing unit is configured to select, from the detected second signals, only those second signals, which emanate from the location or region of interest on and/or within the tissue, and to determine, based on the selected second signals, the one or more parameters regarding the content and/or property of the at least one biomolecule of interest at the location or region of interest on and/or within in the tissue. In other words, the one or more parameters are determined based (only) on second signals emanating from the position(s) of location(s) or region(s) of interest, which was or were previously determined based on the spatially resolved first signals. In this way, metabolic relevant positions, e.g. above and/or within blood vessels, can be reliably determined (localized) based on first signals, e.g. a spatially resolved optical (e.g. due to scattering and/or reflection) response to irradiating the tissue with visual and/or near-infrared radiation, e.g. by determining the positions where the first signals are below a predetermined signal value or where the corresponding absorption exceeds a predetermined absorption value. Then, only second signals emanating from the determined metabolic relevant positions are used (selected) for determining the one or more parameters regarding the content or property of the at least one biomolecule of interest at the location or region of interest on and/or within in the tissue, for example a concentration of glucose and/or lactate in the blood vessels.

Preferably, the at least one detection unit is configured to detect the second signals in a temporally resolved manner so as to obtain a series of second signals over time, and wherein the processing unit is configured to select second signals, which were detected at a particular time and/or during a particular time range and generated at the location of interest and/or within the region of interest, respectively, from the series of second signals, and to determine, based on the selected second signals, the one or more parameters regarding the content and/or property of the at least one biomolecule of interest at the location or region of interest on and/or within in the tissue. Preferably, the processing unit is configured to sum up and/or integrate the selected second signals, which were detected during a particular time range and generated within the region of interest, and to determine, based on the summed up and/or integrated selected second signals, the one or more parameters regarding the content and/or property of the at least one biomolecule of interest at the region of interest on and/or within in the tissue. This embodiment, which is also referred to as "time decomposition", comprises processing the signal(s) detected over time (i.e. time resolved) and allows, e.g., for a spatial, in particular depth, localization and sectioning of measurements (also referred to as "depth profiling" or "time gating"). Advantageously, by means of time differentiation it is possible to select or consider signals coming deeper from tissue or more superficially, i.e. to select where the measurement is recorded from. This is of particular advantage, e.g., for glucose measurements, wherein the time interval is preferably determined so that the measurements exclude responses from superficial layers of the epidermis (termed superficial-skin-layer rejection), while instead integrating signals coming from deeper layers, for example from the stratum spinosum or, preferentially, from the capillary loop layer where the concentration of glucose in blood vessels is much higher than in interstitial fluid (by factor 100). In this way, by superficial-skin-layer rejection, the sensitivity of detection is increased considerably. Further preferred aspects of time decomposition or time gating are described in detail below.

Preferably, the at least one irradiation unit is configured to subsequently irradiate the location or region of interest on and/or within the tissue with electromagnetic radiation at different wavelengths or wavelength ranges in the mid-infrared spectral range. The at least one detection unit is configured to subsequently detect second signals corresponding to optoacoustic signals emanating from the irradiated location or region of interest on and/or within the tissue in response to subsequently irradiating the tissue with the electromagnetic radiation at the different wavelengths or wavelength ranges, respectively. The processing unit is configured to determine, based on the subsequently detected second signals, an optical absorption spectrum of the location or region of interest on and/or within the tissue. This embodiment relates to an exemplary implementation of the so-called "acoustic spectral decomposition" and preferably comprises illuminating the tissue with mid-infrared radiation the wavelength(s) of which is(are) tuned, preferably with a narrow linewidth of approx. 0.5 to 10 $cm^{-1}$, along a given spectral range, preferably between 1000 nm to 16000 nm (1 μm to 16 μm), while simultaneously recording the acoustic response at each excitation wavelength. The frequency content of the detected signals at each wavelength is analyzed to obtain the frequency distribution vs. tuning wavelength, in particular to determine the frequency at the maximum intensity. Preferably, the optical absorption spectrum of the sample is calculated based on an analysis of the acoustic response to mid-infrared excitation at each wavelength.

Preferably, the at least one irradiation unit is configured to simultaneously irradiate the location or region of interest on and/or within the tissue with electromagnetic radiation at different wavelengths or wavelength ranges in the mid-infrared spectral range. The at least one detection unit is configured to simultaneously detect second signals corresponding to optoacoustic signals emanating from the irradiated location or region of interest on and/or within the tissue in response to simultaneously irradiating the tissue with the electromagnetic radiation at the different wavelengths or wavelength ranges, respectively. The processing unit is configured to determine, based on the simultaneously detected second signals, an optical absorption spectrum of the location or region of interest on and/or within the tissue. That is, rather than tuning the wavelength/s of the mid-infrared excitation radiation (i.e. subsequently irradiating the tissue with mid-infrared radiation at different wavelengths or wavelength ranges), in this alternative implementation of the "acoustic spectral decomposition" the tissue is illuminated by a broadband mid-infrared radiation and the acoustic response thereto, comprising contributions by all excitation wavelengths in the range, is detected, wherein the wavelength-by-wavelength acoustic spectra analysis as explained above can preferably be used as a reference to calculate the optical absorption spectra of the sample (tissue) encoded in the acoustic signal.

Preferably, the signals emerging from the tissue are detected in a spatially resolved manner by means of point-by-point scanning. Alternatively, a spatially resolved detection of the signals can be implemented by wide-field imaging, preferably in the following way: the sample, e.g. biological tissue, is acoustically coupled to a reflection-mode detector (RMD) comprising an acoustic encoder element, also referred to as "sensitive element", with a wideband acoustic response preferably provided by a fractal resonant structure, coupled, integrated, or composing the acoustic encoder. Preferably, the acoustic encoder is at least partially transparent to mid-infrared radiation as well as to acoustic waves and provides different acoustic responses for different locations in contact with the sample. Preferably, the spatial-acoustic response of the acoustic encoder at each contact point with the sample can be detected by raster scanning the focused mid-infrared excitation beam (with typical spot size between 1 to 15 μm) while simultaneously acquiring the acoustic response generated at each location by an ultrawideband ultrasound detector. Once the acoustic response of the encoder is determined, wide illumination is applied to the sample in contact with the encoder and the acoustic signal comprising the contributions by individual locations is recorded and then deconvolved to form intensity maps using the spatial-acoustic response of the acoustic encoder as reference. Unlike prior art, this approach preferably uses a fractal resonant structure to enhance and enrich the spatial-acoustic encoding range of the acoustic encoder to produce wide-field imaging using a single ultra-wideband ultrasound detection element integrated to the reflection-mode detector.

Preferably, the at least one irradiation unit is configured to subsequently irradiate the location or region of interest on and/or within the tissue with coherent electromagnetic radiation at different wavelengths or wavelength ranges in the mid-infrared spectral range. The at least one detection unit is configured to subsequently detect second signals corresponding to incoherent optothermal signals, in particular thermal radiation, emanating from the irradiated location or region of interest on and/or within the tissue in response to subsequently irradiating the tissue with the coherent electromagnetic radiation at the different wavelengths or wavelength ranges, respectively. Preferably, the at least one detection unit comprises one or more bolometric and/or pyroelectric detector elements which are configured to detect thermal radiation and/or temperature or temperature changes. The processing unit is configured to determine, based on the subsequently detected second signals, at least one optical absorption property and/or thermodynamic property of the location or region of interest on and/or within the tissue. Preferably, the device further comprises an optical element provided between the at least one irradiation unit and the tissue and configured to transmit the coherent electromagnetic radiation to the sample so as to irradiate the location or region of interest on and/or within the tissue with the coherent electromagnetic radiation, and to direct and/or reflect at least a part of the second signals corresponding to incoherent optothermal signals emanating from the irradiated location or region of interest on and/or within the tissue towards the at least one detection unit. According to these embodiments, which relate to the so-called "thermal spectral decomposition" aspect of present disclosure, an analysis and decomposition of thermal signals generated in the tissue in response to (coherent) mid-infrared radiation excitation allows for determining the optical and thermodynamic properties of the sample (tissue), preferably in the following way: narrow linewidth, typically 0.5 to 10 $cm^{-1}$, mid-infrared laser excitation at one or more wavelengths, preferably in a range between 1000 nm to 16000 nm (1 μm to 16 μm), is applied to a biological sample. Absorption of coherent pulsed mid-infrared laser energy excites vibrational transitions, and energy is subsequently re-emitted as broadband incoherent heat emission with wavelengths ranging the 1000 nm to 25000 nm, as described by black body radiation theory. Here, the thermal radiation spectra of the radiator define the temperature of the radiator according to Wien's law. Since the temperature increase of the sample due to mid-infrared excitation is proportional to the optical absorption, optical absorption properties can be calculated by analysis of the thermal radiation spectra and temperature distribution of the excited tissues. Additionally, the thermal decay profile, with thermal decay constants ranging from microseconds to milliseconds, is dictated by the thermodynamic properties of the tissues as well as its initial temperature (which is also proportional to optical absorption). Detection of the thermal spectra and/or temperature is implemented, for example, by a single or an array of bolometric and/or pyroelectric detector elements. This approach, unlike prior art, allows for analyzing the thermal spectra containing information from deeper layers of the excited tissues and not only the from superficial tissue layers as when measuring specular reflected signals.

FURTHER ASPECTS REGARDING THE BACKGROUND, GENERAL, PREFERRED AND ALTERNATIVE ASPECTS OF PRESENT DISCLOSURE

Accurate measurement of metabolic-relevant parameters such as glucose, lactate, hydration, lipid levels, etc. is of prime importance for management and prevention of complications in several metabolic diseases (such as diabetes and obesity). Furthermore, it is also important for assessing performance in sports, recreational activities, and as general indicator of health status. Although measuring metabolites is possible by blood extraction, application to day-to-day personal health self-care and sports require metabolic monitoring to be performed non-invasively by a portable device. As an answer to this need, non-invasive methods for metabolic monitoring based on molecular vibrational excitation by quantum cascade lasers (QCLs) have been proposed and tested. Such methods (prior art) have shown promising results but have not been yet effectively translated to real-time wearable devices for monitoring of human metabolism due to the following limitations:

a) Prior art provides only bulk tissue measurements that do not discriminate the dimensional (spatial, temporal, or multi-spectral) origin and content of the retrieved signals, therefore, are unable to account for the heterogenous distribution and relative composition of metabolites in human tissues.
b) Due to (a), effects of skin differences between individuals and/or on the same individual under different conditions (perspiration, dirt, dehydration, accumulation of skin bioproducts, etc.) negatively affect the accuracy of the measurements.
c) Prior art is limited to large lab-bench setups due to the use of bulky laser sources and detectors as well as the need of optical-path purging (typically by enclosing the beam in an inert gas chamber, e.g. dry Nitrogen). This results on metabolic sensors of impractical size and weight for portability.

These technical limitations hamper specificity, reproducibility, and portability, which are vital for precise wearable devices to monitor human metabolism in real-time and day-to-day real-life conditions.

Present disclosure preferably relates to a sensor device and method that preferably performs a dimensionality decomposition to achieve accurate measurements of metabolites in tissues in-vivo. In particular, the sensor maximizes sensitivity, specificity, and accuracy to provide location- and molecular-specific measurements of metabolites in biological tissues by decomposing the spatial (surface and depth), temporal, and multi-spectral (e.g. optical, acoustic, and thermal) dimensions of mid-infrared readouts.

In particular, present disclosure addresses the above-mentioned limitations preferably by a dimension-selective detection of mid-infrared signals in tissue in vivo, including human tissue. Preferably, the ability to determine the spatial, temporal, and multi-spectral origin of the retrieved signals allows to accurately localize/identify and/or select metabolites and optimal measurement parameters and metabolite-containing structures/compartments, making it possible to account for tissue/metabolic heterogeneity. Preferably, size and weight are minimized by integrating optical excitation, light delivery, detection, and signal read-out on infrared/visible on-substrate-grown lasers and waveguides; for instance, silicon-on-isolator waveguides, germanium-on-insulator waveguides, silicon-germanium-on-insulator waveguides, on-silicon grown laser arrays and/or substrate-emitting ring lasers.

By means of a device and method according to preferred aspects of present disclosure it is possible to retrieve specific metabolic parameters (such as: glucose, lactate, and/or lipid levels) at specific and (pre-) selected tissue locations and tissue depth that are linked, embedded, distributed, referenced, and/or encoded preferably in at least one of the following dimensions:

Space (where): Location-specific discrimination of the optical absorption properties of human tissue allows spatial metabolic profiling; which in turns make it possible to identify and select measurement locations, anatomical structures (on the surface and as a function of depth), and/or compartments that highly represent and accurately report on the concentration of the metabolite being measured. It also makes it possible to avoid locations with low metabolite concentration and therefore that poorly (or only weakly) represent and/or report metabolite concentration and dynamics. Location-specific metabolic profiling also allows to identify measuring points that can be used for metabolic reference.

Time (when): The temporal dimension is rich in information that contributes to uniquely determining the source of the measured signals. Time parameters are preferably used for (1) depth-profiling also termed "time-gating", (2) rejecting surface contributions to the signal also termed "skin-rejection", (3) determining thermodynamic properties of the measured structures, e.g. heat capacity, thermal diffusivity, density, etc., and (4) metabolic profiling over time, i.e. temporal monitoring of metabolism and calculation of metabolic rates (time gradients). A particular further benefit of time features is the ability to generate internal referencing of the signals measured, for example through ratiometric approaches, or other mathematical operations that combine two or more measurements at different time-points.

Spectrum (what): Identification of the multi-spectral features of the mid-infrared signals provides enhanced specificity over prior art by accounting not only for unique hallmarks of the structure(s) and metabolite(s) of interest but also for hallmarks of interfering factors. The multi-spectral decomposition preferably includes optical, acoustic, and thermal spectra generated in response to modulated electromagnetic excitation of biological tissues. Identification and selection of anatomical structures, metabolites, and physical-chemical attributes can be achieved by analysis and decomposition of continuous and/or discrete spectra. A particular further benefit of multi-spectral feature identification is the ability to generate internal referencing of the signals measured, for example through ratiometric approaches, or other mathematical operations, for instance through neural networks, that combine two or more measurements at different spectral features.

Multidimensional decomposition. According to preferred aspects of present disclosure, a multidimensionality decomposition is performed to achieve particularly accurate measurements of metabolites in tissues in vivo. In particular, the device and method preferably decompose the spatial (surface and depth), temporal, and/or multi-spectral (e.g. optical, acoustic, and thermal) dimensions of optically-generated readout signals to determine unique features of metabolites and tissues across multiple dimensions. This allows a multidimensional triangulation of metabolic and tissue parameters which enhances specificity.

This is preferably achieved by uncoupling or separating signals from different dimensions. For instance, the information on the location in depth of a metabolite can be calculated from the time arrival of the signals (time decomposition). In another example, the acoustic composition of the signals can be used to obtain information on the size of the compartments where the metabolites are located (spatial decomposition), for example the thickness of skin layers. The acoustic spectra also encode information of the optical absorption. Namely, the optical spectrum of the retrieved mid-infrared signals can be obtained by analysis of the frequency response and frequency content of the detected acoustic signal. Multidimensional decomposition is explained in more detail below. These signals can be analyzed from a broad spectrum, preferably spanning from 1 to 16 micrometers, in particular from 3 to 16 micrometers, of optical wavelength or from selected windows within this spectral range. For reference, this spectral range is called herein "mid-infrared". This spectral range is particularly beneficial due to specific spectral signatures of different metabolites of interest within this spectral range.

Dimension/location selective detection of light absorption signals in vivo. According to further preferred aspects of present disclosure, a detector retrieves signals and/or spectra proportional to the absorption of optical radiation by tissues in vivo in such a way as to be able to allow preselection of measurement points and recording of signals with multidimensional content, as described above. The detector can be contactless or in direct contact with the sample and is composed of an active element, also referred to as "sensitive element", that interacts with the signal produced in the sample and undergoes a change in, e.g., temperature, refractive index, reflectivity, surface curvature, local pressure, polarization, electrical resistance, color, and/or any of its thermal, mechanical, chemical, optical, magnetic, electric, structural, or geometric properties. These changes due to optical (mid-infrared) excitation can also occur and be measured directly in the irradiated tissues, in which case the sample itself is considered as active element for detection.

Portability. According to further preferred aspects of present disclosure, a modular integration of features and/or elements disclosed herein and/or a read-out-element described below notably reduces restrictions on portability of the metabolic sensor device by promoting reduction of size, weight, and energy consumption compared to prior art. Preferentially, one or more of the components, elements of the device disclosed herein are integrated and/or contained in the same enclosure. Preferably:

a) Interfering-gas rejection in connection with light delivery is performed (as described further below), preferably by avoiding bulky and/or heavy inert-gas chambers (exhibiting a volume of 100's of $cm^3$ or more) and instead delivering, directing, and/or modifying the excitation beam embedding in a solid mid-infrared transparent element (of only few $mm^3$ or below), also referred to as "mid-infrared light guide element", along its path from (completely or partially) the emission source, also referred to as "irradiation unit", to the excitation point or region of interest on or in the tissue. This can be achieved, for instance, by infrared and/or visible substrate-based waveguides, for example, silicon-on-isolator, germanium-on-insulator, silicon-germanium-on-insulator, etc.
b) A multiple-encoded emission (as further described below) makes use of integrated light-emitting elements, preferably quantum cascade lasers, interband cascade lasers, laser diodes and/or diode lasers, sharing the same heat management and electronics. Arrays of these emission elements can be printed, grown, deposited, and/or allocated in a common substrate to minimize spatial separation among emitting elements by, for instance, on-silicon grown laser arrays and/or substrate-emitting rings.

c) Unlike with conventional approaches, for instance deflectometry by total-internal-reflection, the detector, also referred to as "detection unit" or "probe beam detector", respectively, and/or a read-out element (as further described below) supports portability of the metabolic sensor by reduction of the dimensions integrating read-out and/or detection components by infrared/visible substrate-based waveguides, for instance, silicon-on-isolator, germanium-on-insulator, silicon-germanium-on-insulator, etc.

Selection of measurement point(s). Preferably, before measuring and determining metabolite concentrations, the device and/or method first seeks for metabolic relevant positions, also referred to as "location of interest" or "region of interest", in the tissue measured (e.g. blood vessels, stratum spinosum, etc.), in distinction to metabolic irrelevant positions and/or interfering structures (e.g. stratum corneum, water/fat cumuli, etc.). Preferably, the identification of structures can occur with at least one of the following elements:

a) A camera integrated in the sensor device, for example a camera and illuminator operating in the visible light, near-infrared or mid-infrared spectrum.

b) A scanning unit or system with parallel channels which can collect the first signals from different locations of the tissue interrogated (in response to visible, near-infrared or mid-infrared radiation), termed herein "locations of interest" (LOI).

Preferably, identification of locations of interest (LOI) based on option (a) above can be done by using image processing techniques. In this case, a processor analyzes the images collected by the camera, and identifies areas of contrast representative of superficial vascular structures, or other structures of interest. For example, areas of high light attenuation representative of underlying vascular structures. Increased accuracy and sensitivity can be imparted by operating the illuminator and the camera within specific wavelengths, whereby the LOI is most notable, for example, by using a wavelength of approx. 670 nm, where arteries and arterioles present high absorption, or 580 nm, where both arterial/arteriole and venous/venule contributions can be seen.

Preferably, identification of LOI based on option (b) above can be done by analyzing signals collected over an area and identifying the areas of the higher contrast. In this case again the contrast analyzed will depend on the wavelength(s) and/or optical spectrum collected for the measurement and can include processes that identify specific contrast in the spectrum collected.

Preferably, after having identified relevant structures and/or locations, measurements of metabolites are reported from the selected LOI's. By analyzing and reporting values from LOI's of high relevant contrast enhances the overall accuracy and repeatability of the measurements by accounting for skin/metabolism heterogeneity and by choosing structures with high content/activity of the metabolite being measured. This enhancement may be further amplified by selection of depth (z), for instance by time-selection and separation of the time signal recorded which results in depth (layer) selective readings as mentioned above. This can be applied to any type of detection, either optothermal or optoacoustic signals.

Compact interfering-gas rejection and light delivery. Preferably, without the need of a bulky inert gas or vacuum chamber, the device and/or method according to preferred aspects of present disclosure avoid interference (partially or completely) from mid-infrared active atmospheric/external gases (water vapor, $CO_2$, alcohols, etc.) along the propagation path of the mid-infrared excitation beam. This is achieved by means of a mid-infrared light delivery element, also referred to as "mid-infrared light guide element", with dimensions just enough as to allow the partial or complete transmission of the excitation beam (typically from 5 μm to 5 mm diameter) from the emission source to the excitation spot. Preferably, the light deliver element is composed entirely, partially, or of combinations of ZnS, ZnSe, $CaF_2$, Ge, Si, etc, and/or forming substrate-based waveguides. In this way, by eliminating, avoiding, or considerably reducing interference from external mid-infrared active gases, it is possible to enhance light delivery efficiency and detection reproducibility, stability, and accuracy. In this way, the use of an atmospheric-gas purging chamber with dimensions several order of magnitude larger can be avoided so that the size of the sensing device is considerably reduced.

Multiple-encoded optical emission. According to preferred aspects of present disclosure, the device and/or method uses multiple-encoded optical emission to enhance selectivity and sensitivity by creating a unique response on tissues for each emitting source. Since different tissues or tissue properties can have a unique response to a given encoding pattern, by means of encoded optical excitation, it is possible to selectively generate metabolite-, tissue-, and/or depth-specific readouts. This is achieved, for example, by emitted light of one, or more, or each of the emitting elements to have different (fixed or changing) values of polarization directions, circular or linear, pulse durations, repetition rate and/or frequency, intensity modulation and/or linewidth modulation. Preferably, within present disclosure, the encoded emitted light having different values is also referred to as "different types of electromagnetic radiation", which differ from each other and/or are encoded with respect to at least one of the aforementioned properties, e.g. polarization directions, circular or linear, pulse durations, repetition rate and/or frequency, intensity modulation and/or linewidth modulation. Preferably, the device and/or method uses encoded light emission to distinguish readouts originated from different emitting wavelengths, tissue locations, and analytes by manipulating each emitting element of the device so that one or more of the physical parameters of the emitted light is modified and/or modulated in a unique manner. This is done in such a way that the effect of each emitting element on tissues can be unmistakably and/or uniquely identified and/or decoded by the readout and processing modules.

Selective separation of overlapping optical spectra. According to further preferred aspects of present disclosure, it is possible to evoke molecular-specific responses on one or more analytes of interest at common absorption wavelength(s) to distinguish among the overlapping absorption spectra of biomolecules composing the tissues being analyzed. This can be implemented, for example, by pre-excitation of the vibrational states, primary and/or overtones, to induce differential optical saturation at single or multiple wavelengths or along a defined spectral range. Specifically, primary (single or multiple) short mid-infrared pulses are used to pre-excite a given absorption wavelength while a secondary (single or multiple) excitation at the same wavelength of the first are used to probe its response, simultaneously or with a time delay. The signal produced by the first and secondary excitation will have a different response for different analytes, for instance glucose and lactate, or glucose and water. Subtraction of the two signals (from excitation and probe) will report on the content of analytes with similar spectra but with different optical saturation levels. Since this can be performed at each wavelength on a given spectral range, the differential optical saturation spectra can be used to separate analytes of overlapping absorption spectra based on their different optical saturation response.

Figure 2:
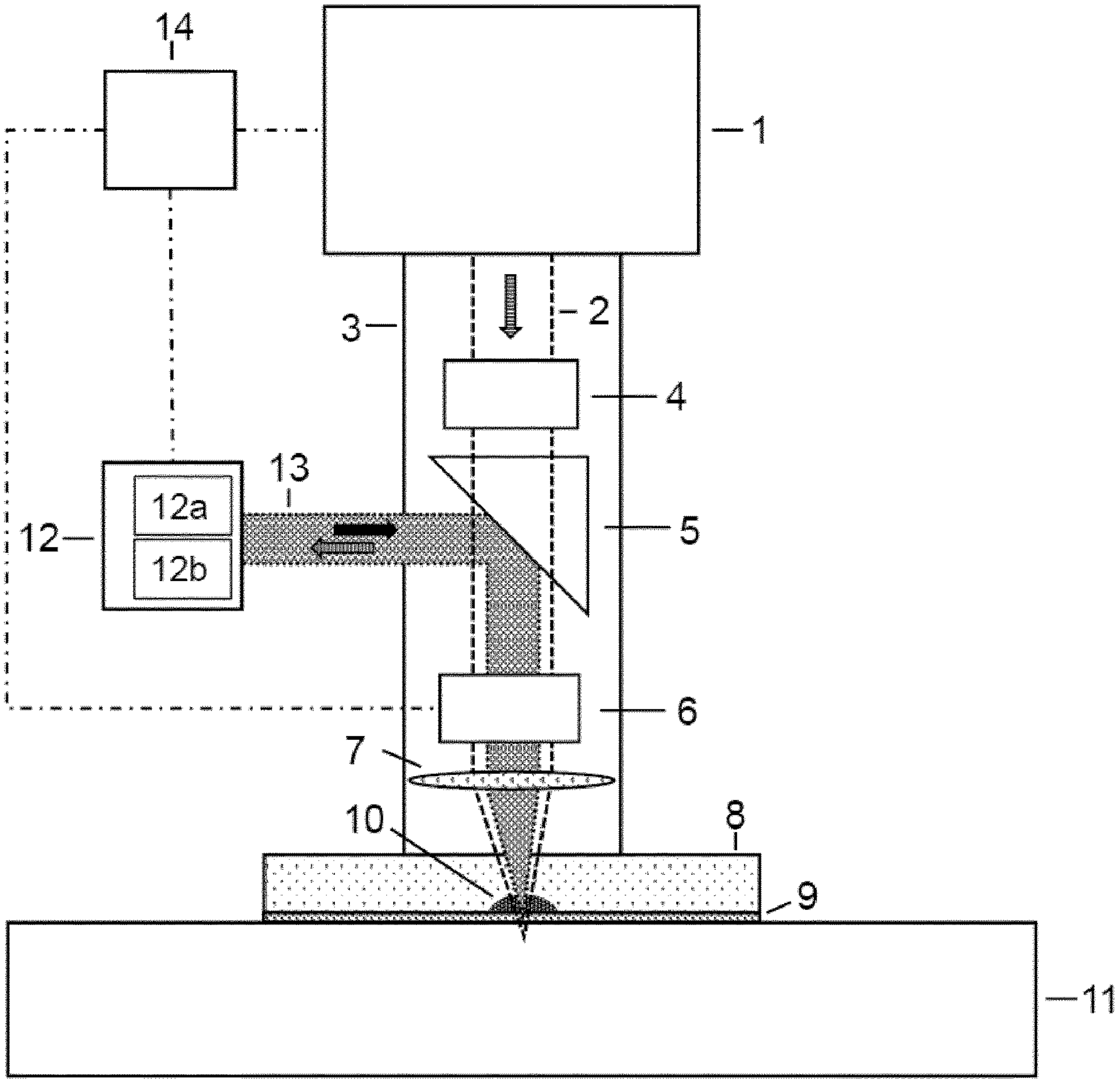
Figure 3:
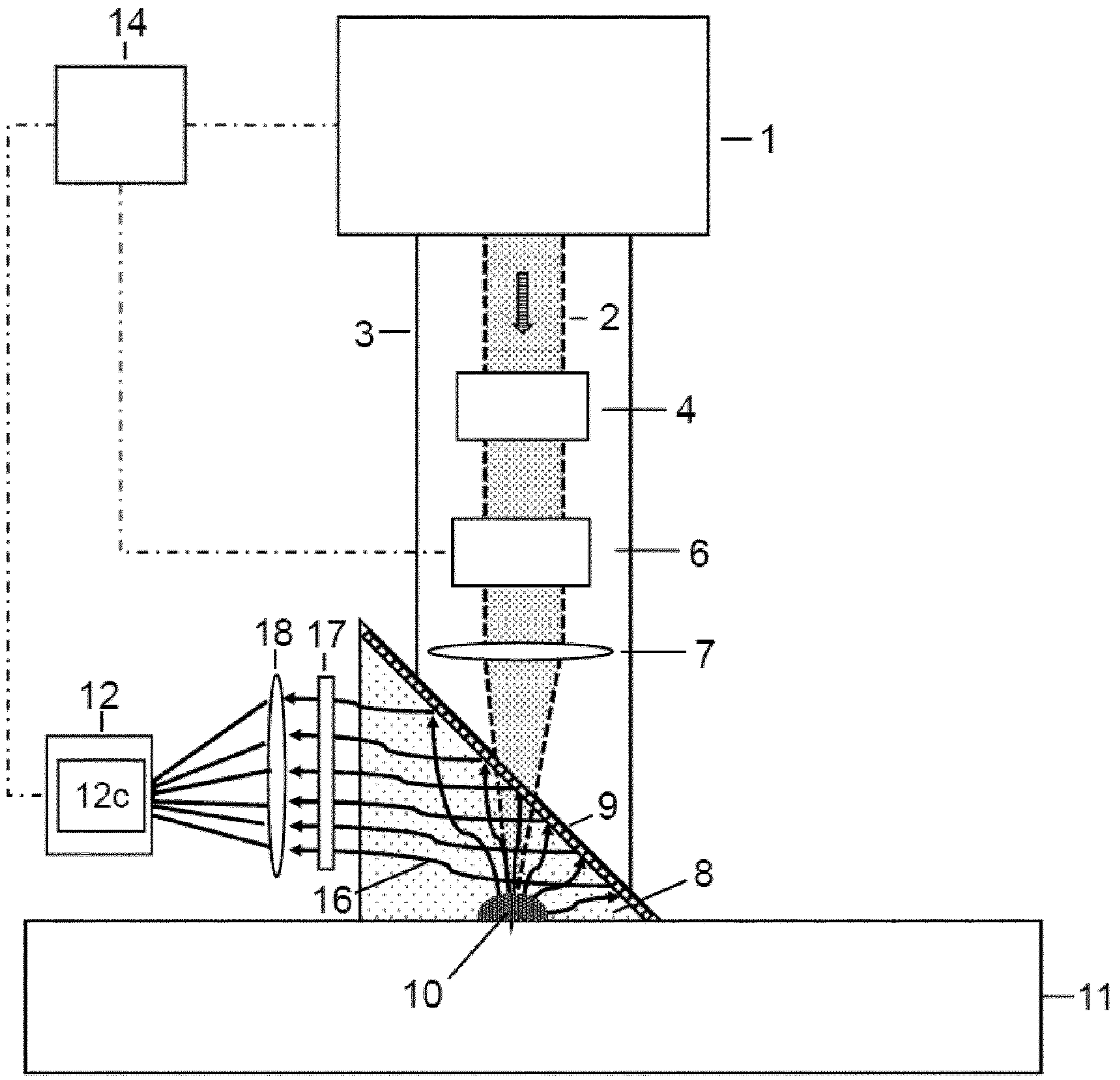
Figure 4:
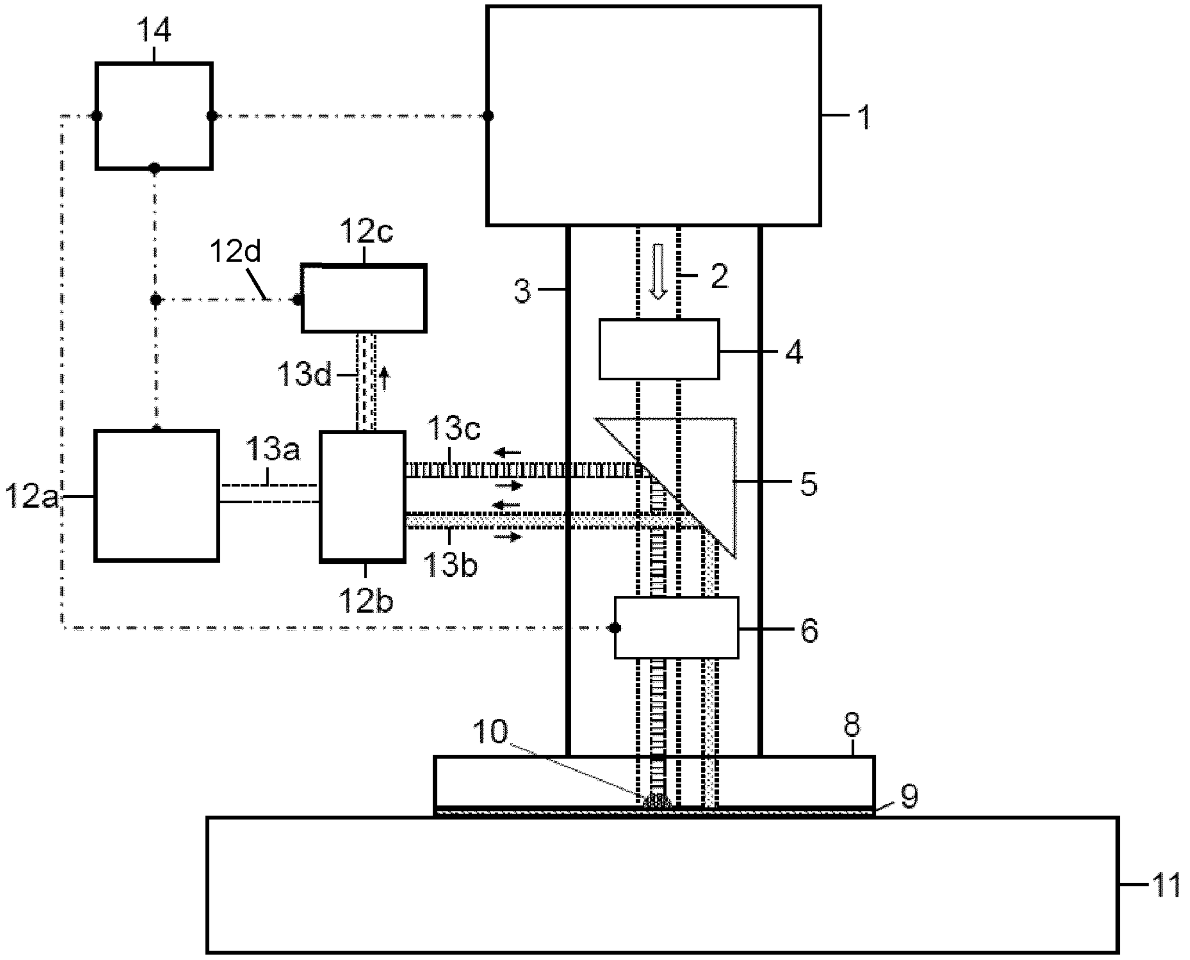

Further advantages, features and examples of the present invention will be apparent from the following description of following figures showing:

FIG. 1 a block diagram representation of modules of an example of a sensor device, in particular a dimension-selective portable metabolic sensor device;

FIG. 2 a schematic representation of another example of a sensor device, in particular a sensor device for non-invasive metabolic sensing by localized detection of optoacoustic and/or optothermal signals;

FIG. 3 a schematic representation of yet another example of a sensor device, in particular a sensor device for non-invasive metabolic sensing by localized detection of optothermal radiation; and FIG. 4 a schematic representation of yet another example of a sensor device, in particular a sensor device for non-invasive dimension-selective metabolic sensing by localized reflection-mode pump-and-probe detection of optoacoustic/optothermal signal with dual probe-beam noise suppression.

FIG. 1 shows a block diagram representation of modules of an example of a sensor device, preferably a dimension-selective portable metabolic sensor device, for determining one or more parameters regarding a content and/or property of biomolecules, in particular metabolites, in a biological tissue, also referred to as "sample".

Preferably, the device comprises an Encoded Light Emitting Module (ELEM), a Light Delivery Module (LDM), a Read-Out Module (ROM), a Refection-Mode Detector (RMD) and a Processing Module (PM). It is noted that the relative place of the different components can change relative to each other in any order and dimension.

Preferably, the Encoded Light Emitting Module (ELEM), also referred to as "at least one irradiation unit", comprises one or more elements emitting electromagnetic radiation at least at one wavelength or wavelength range in the mid-infrared region, preferably with at least one attribute or property of the electromagnetic radiation manipulated in a unique way so as to obtain at least two different types of electromagnetic radiation, such that readouts (i.e. signals generated in and emanating from the sample) in response to an excitation with the different types of electromagnetic radiation can be distinguished.

Preferably, the mid-infrared Light Delivery Module (LDM), also referred to as "mid-infrared light guide element", delivers electromagnetic radiation emitted by the ELEM to the sample while simultaneously eliminating, avoiding, or considerably reducing possible interference from external mid-infrared active gases.

It is noted that, depending on the exact spectral components selected in the ELEM, the LDM can be omitted, in particular for measurements in the lower part of the mid-IR range (e.g. between approx. 1 and 3 micrometers).

Preferably, the forward-looking Reflection-Mode Detector (RMD), also referred to as "sensitive element", is sensitive to signals, in particular to optothermal and/or optoacoustic signals, generated by encoded mid-infrared excitation of the sample.

Preferably, the Read-Out Module (ROM) is configured to retrieve changes in the properties of the Reflection-Mode Detector (RMD) or sensitive element. Preferably, the ROM may comprise a probe beam source configured to generate a probe beam, a probe beam guide unit configured to guide and/or direct the probe beam towards the RMD and/or at least one sensitive element, and a probe beam detector configured to detect the probe beam after it has been at least partially reflected at or by the RMD and/or at least one sensitive element.

Preferably, the processing module (PM), also referred to as "processing unit", is configured for processing and decoding of the detected signals, decompose the abovementioned dimensions, and compute values corresponding to the concentration of the metabolite or metabolites monitored.

Further preferred features of the components of the device shown in FIG. 1 are described in the following.

The Encoded Light Emission Module (ELEM) preferably comprises at least one mid-infrared radiation-emitting element and electronics with at least one mid-infrared emission wavelength. In a preferred embodiment the ELEM can accommodate a single emission element (tunable, single-wavelength, or broadly emitting) or an array of several emission elements (tunable, single-wavelength, and/or broadly emitting), preferentially quantum cascade laser(s) or other more compact sources.

Preferably, each emitting element of the ELEM can be manipulated so that one or more of the physical parameters of the emitted light is modified in a unique manner so that each element of the ELEM can be unmistakably identified/decoded by the readout and processing modules. For example, the emitted light of one, or more, or each of the emitting elements in the ELEM can have different fixed or changing values of polarization directions, circular or linear, pulse durations, repetition rate and/or frequency, intensity modulation and/or linewidth modulation. Unlike prior art, this so-called multiple-encoding feature of the ELEM enhances selectivity and sensitivity by creating a unique response on tissues for each emitting source. Additionally, since different tissue properties can also have unique responses to a given ELEM encoding pattern, by means mid-infrared excitation using ELEM it is possible to selectively generate tissue-specific readouts.

For example, two or more ELEM elements having the same emission wavelength but different pulse duration (for instance 5 ns the shortest and 1 ms the longest) or different pulse repetition rate, or continuous wave modulation (for example 1 kHz the shortest and 100 Mhz the longest) can be used simultaneously to distinguish the mid-infrared signals from different depths. The rationale behind this example is that short pulses, or high modulation frequencies, will generate high-frequency ultrasound signals while long pulse durations, or low modulation frequencies, will generate low-frequency ultrasound signals. Because high ultrasound frequencies are attenuated more efficiently with depth than low ultrasound frequencies, most of the information content of high frequencies signals come from the shallower depths. A subtraction of the signals of low frequency with signals of high frequency allows to discriminate between optical absorption information at different tissue depth.

One challenge in biosensing by vibrational spectroscopy is to be able to distinguish among the many analytes composing biological tissues that, despite having different spectral features, could have strong overlapping spectra. Preferably, the encoding properties of the ELEM can be used here to evoke a molecular-specific response on one or more analytes of interest at common absorption wavelength(s) to distinguish among the overlapping absorption spectra of the biomolecules composing the tissues being analyzed. Excitation with molecular-specific encoding is preferably implemented by pre-excitation of the vibrational states to induce differential optical saturation at single or multiple wavelengths or along a defined spectral range. Specifically, one or a set of ELEM element(s) emit a short mid-infrared pulse to pre-excite a given absorption wavelength while another ELEM element, simultaneously or with a time delay, emits a second probe mid-infrared pulse at the same wavelength of the first. For different analytes (for instance glucose and lactate, or glucose and water) the signal produced by the first pulse will have a different response compared to the signal produced by the second pulse. Subtraction of the two signals, from excitation and probe, will report on the content of analytes with similar spectra but with different optical saturation levels. Since this can be performed at each wavelength on a given spectral range, the differential optical saturation spectra can be used to separate analytes of overlapping absorption spectra based on their different optical saturation response.

Another preferred use of ELEM is for multiplex wavelength discrimination. Here, a tissue is excited by two or more ELEM elements having different wavelengths and a unique attribute assigned to each emission wavelength, for instance, different pulse repetition rates or different pulse train patterns. A single detection and readout element can simultaneously detect the encoded signals and the wavelength discrimination is performed by the processing module using the known encoding pattern for each wavelength.

Preferably, when mid-infrared excitation is provided by multiple ELEM elements, the optical beam path of each element can be modified by an Infrared Beam Combiner (IBC) in such a way as to focus and/or propagate and/or modify the ELEM optical beams (by reflective and/or refractive means) toward the same direction and/or to align them as to share the same optical path.

Preferably, besides comprising at least one emitting element in the mid-infrared region, the ELEM can contain at least one emitting element in the visible and/or near infrared spectral region for easy identification/localization of anatomical structures with strong absorption in this spectral region, such as blood-containing structures, hair follicles, melanin cumuli, nevi, necrotic tissue, etc.

Preferably, the ELEM makes use of integrated light-emitting element(s) or an array of elements printed, grown, deposited, and/or allocated in a common substrate to minimize spatial separation among emitting elements by, for instance, on-silicon grown laser arrays and/or substrate-emitting rings. Preferably, the emission elements of the ELEM are quantum cascade lasers, interband cascade lasers, laser diode and/or diode lasers sharing the same heat management and electronics.

The mid-infrared Light Delivery Module (LDM) preferably avoids and/or minimizes spectral interference (partially or completely) from mid-infrared active atmospheric and/or external gases (e.g. water vapor, $CO_2$, alcohols, etc.) along the propagation path of the mid-infrared excitation beam from the ELEM to the excitation point at the sample. Preferably, the LDM maximizes transfer and stability of the mid-infrared excitation energy by preventing interaction of the excitation beam with external mid-infrared absorbing gases that might arbitrary change in composition and concentration. Additionally, the LDM preferably supports portability of the non-invasive metabolic sensor reducing size and weight by delivering, directing, embedding, and/or modifying the excitation beam by a compact solid mid-infrared transparent element (of only few $mm^3$ or below), unlike conventional devices which use bulky (100's of $cm^3$ or more) inert-gas chambers. In a preferred implementation the LDM is composed entirely, partially, or of a combination of ZnS, ZnSe, $CaF_2$, Ge, Si, etc. Preferably, the LMD can comprise single elements or arrays of infrared/visible substrate-based waveguides, such as, silicon-on-isolator, germanium-on-insulator, silicon-germanium-on-insulator, etc.

The reflection-mode detector (RMD) preferably allows for a forward-looking (i.e. a "reflection-mode" or "epi illumination-mode") retrieval of signals and spectra proportional to the absorption of mid-infrared radiation by the sample, in particular the sample being tissues in vivo, specially human tissues in vivo. The RMD can comprise a single detection element or array of multiple detection elements, also referred to as "sensitive element(s)" or "active element(s)", which can be contactless or in direct contact with the sample. The RMD or sensitive element preferably comprises or is configured as an active element or multiple active elements that interact(s) with the signal produced in the sample and undergo(es) a change in temperature, refractive index, reflectivity, surface curvature, local pressure, polarization, electrical resistance, color, and/or any of its thermal, mechanical, chemical, optical, magnetic, electric, structural, or geometric properties. These changes due to mid-infrared excitation can also occur and be measured directly in the irradiated tissues, in which case the sample itself is considered as the active element for detection. The RMD retrieves optical-absorption signals, in particular mid-infrared absorption signals or any signal excited in the sample by the electromagnetic radiation emitted by the ELEM, in particular optothermal and/or optoacoustic signals, in such a way as to be able to support preselection of measurement points, as described above, and detection of signals with multidimensional content to be used for multidimensional decomposition as also introduced above and further detailed below.

In one preferred implementation, the RMD comprises an element or array of elements, which is/are at least partially transparent to mid-infrared radiation and at least partially transparent to a probe beam, preferentially in the VIS-NIR region. In this implementation, the RMD is in direct contact with the sample and its inner face on the side in contact with the sample reflects the probe beam at least partially, while the excitation mid-infrared beam is efficiently transmitted to the sample. Preferably, the selective probe-beam reflectivity/mid-infrared transmissivity is either an intrinsic property of the material composing the RMD or it is achieved by a customized coating deposited on the surface of the RMD in contact with the sample. Additionally, in this preferred implementation, the RMD allows, at least partially, the internal diffusion/propagation of heat and/or transmission/propagation of acoustic waves. The excitation and probe beams are arranged in the RMD in such a way as to be at least partially co-localized/aligned sharing the same illumination area in the inner face of the RMD directly adjacent to the contact point with the sample. In this way, when the mid-infrared excitation beam generates optoacoustic and/or optothermal signal due to the optical absorption properties of the sample, heat deposition and/or acoustic propagation in the RMD changes its refractive index, according to its intrinsic dn/dT and dn/dP constant, perturbing the local reflectivity of the inner face of the RMD and the unperturbed properties of the probe beam, for example its reflection intensity, polarization, focusing, etc. The changes in the reflected probe-beam are modulated according to the properties defined by the ELEM, for example intensity modulation at a pre-defined frequency. This allows selective detection of the mid-infrared modulated reflected probe beam, with information on the absorption properties of the sample, for example by look-in amplification. Preferred materials for this RMD implementation are ZnS, Ge, and/or Si.

Unlike with conventional devices, for instance mid-infrared deflectometry by total-internal-reflection, aspects according to present disclosure support portability of the metabolic sensor by reduction of the dimensions integrating read-out and/or detection components by infrared/visible substrate-based waveguides, for instance, silicon-on-isolator, germanium-on-insulator, silicon-germanium-on-insulator, etc.

The Read-Out Module (ROM) preferably retrieves and converts physical changes in the RMD generated due to the action of ELEM excitation on the sample in a quantifiable way, for instance in the form of voltage intensity. The ROM can operate on different principles, for example, pump-and-probe reading, electrical-load charge/discharge reading, or by direct reading/measurement of a physical, chemical, morphological, and/or structural property directly on the sample, for instance measurement of the local temperature on the sample surface or on individual or multiple elements of the RMD. In a preferred implementation the ROM is composed and/or integrated in/of a substrate-based waveguide, for instance, silicon-on-isolator, germanium-on-insulator, silicon-germanium-on-insulator, etc. that reads phase changes in an optical probe beam, preferentially a visible/near-infrared beam, by interferometric means where an optical detector of the RMD converts changes of phase into electrical signals. The ROM can be integrated or be in contact with the RMD or perform a reading in a remote way (contactless).

The processing module (PM) is preferably able to decompose the dimensional content and to compute and to display values corresponding to the concentration and/or distribution of the metabolite(s) monitored. Preferably, the processing module harvests on the multi-dimensionality of the signal to calculate, for instance by multi-layer artificial neural networks, common interdimensional parameters from different independent perspectives. In a sense, the processing module performs an interdimensional triangulation of parameters.

Multidimensional Decomposition

Preferably, the information of the metabolic distribution and content of tissues is encoded in the dimensions composing the mid-infrared signals generated by interaction of the sample with the ELEM excitation and retrieved by the RMD and ROM. Preferably, multi-dimensional decomposition of these signals by the PM allows highly specific detection of the metabolite(s) of interest and containing compartment(s) by measurement of unique features along multiple dimensions. Due to the cross-talk among dimensions, native parameters of one dimension can be obtained from another. For instance, the information on the location in depth of a metabolite can be calculated from the time arrival of the signals (also referred to as “time decomposition”). In another example, the acoustic composition of the signals can be used to obtain information on the size of the compartments where the metabolites are located (also referred to as “spectral decomposition”), for example the thickness of skin layers. The acoustic spectrum also encodes information of the optical absorption, namely, the optical spectrum of the retrieved mid-infrared signals can be obtained by analysis of the frequency response and content of the acoustic signal.

Preferably, the metabolic sensor and/or method implements multidimensional decomposition to identify and locate in space and time metabolites with high accuracy, precision and specificity preferably by applying at least one of the following:

Spatial decomposition. Preferably, processing the signal(s) detected in space (i.e. spatially resolved) allows for a spatial localization of metabolites and/or anatomical structures containing them. For example, blood vessels; sebaceous glands; lymphatic vessels; pores; skin layers such as stratum corneum, stratum spinosum, stratum basale, and/or deeper layers in the dermis. This can be achieved, for example, by: raster scanning, wide-field illumination/detection, confocal sectioning, and/or by Z stacking along the vertical direction or by the integration of a small camera on the sensor.

Raster scanning: This is preferably implemented by displacing the sample relative to a focused excitation beam (typical spot size is preferably between 1 and 15 μm) or by displacing the focused excitation beam relative to the sample over an area of interest while optical readouts are obtained along the scanning area or by a system of parallel channels that can record from different spatial locations. The excitation can be at the mid-IR or further by excitation in the visible or near-infrared to select locations of interest (LOI’s) of high contrast. The system allows for a determination of the coordinates of the mid-infrared readouts (for example, by means of referenced motorized stages or by referenced galvo-mirrors), making it possible to obtain readout intensity maps with values related to the interaction of mid-infrared signals with tissues and distribution of metabolites.

Wide-field: Preferably, here a large area, ranging from 100’s of $\mu m^2$ up to 10’s of $mm^2$, is illuminated with mid-infrared light, near-infrared light or visible light and the response of the sample to the illumination (in particular mid-infrared excitation) over the area is completely or partially acquired by the RMD and ROM, for instance, by recording the spatial distribution of any of the parameters allowed by the detector and readout modules, i.e. temperature, refractive index, reflectivity, local pressure, polarization, color, and/or any of its thermal, mechanical, chemical, optical, magnetic, structural, or geometric properties. This is preferably achieved by an array of RMD elements and/or ROM elements or by decomposition of the acoustic signal by means of the PM where only a single wide-band RMD and ROM element is needed (see acoustic spectral decomposition).

Confocal sectioning: Preferably, here the optical excitation beam from the ELEM is tightly focused (typical spot size preferably between 1 and 15 μm) to the sample while the readout signal (for instance optical, thermal, or acoustic) is filtered by a spatial filter before detection. By displacement of the filtering device (for example a pinhole) metabolic profiling in depth with rejection of out-of-focus signal is achieved.

Z stacking: Preferably, here a tightly focused beam (typical spot size between 1 and 15 μm) and/or sample are displaced relative to each other along the axial direction in such a way as to focus mid-infrared light on specific sections (or skin layers) of interest. Since the readout signals condense information mainly coming from the focal zone, the signal from superficial metabolically inactive layers can be rejected, minimized, and/or avoided by filtering out-of-focus signal, for example, by time windowing of the readout signals (time decomposition).

Preferably, for the purpose of spatial decomposition describe above, the visible or near-infrared excitation does not necessarily require pulsed illumination, since its primary purpose is to identify LOI's, not to generate mid-IR time-dependent signals, employed in the measurements of metabolites. However, mid-IR selection of LOI's can also be based on the same (time-varying, e.g. pulsed) illumination employed also for the mid-IR metabolite measurements.

Time decomposition. Preferably, processing the signal(s) detected over time (i.e. time resolved) allows, for example, for a spatial, in particular depth, localization and sectioning of measurements (also referred to as "depth profiling"). This is preferably achieved by timing the relative time of the detected signals, from an excitation energy that excites a change in the medium studied. This timing can be achieved in the time-domain in a classical fashion or in the frequency domain by the Fourier equivalent measurement of time based on phase delays, as described in textbooks. To explain this preferred feature in classical terms in the time domain, an excitation with mid-infrared energy in the form of a pulse with a duration in the nanosecond to millisecond range at time $t_t$ is assumed. The RMD and ROM element(s) record signals at subsequent times $t_n$ that are measured as delays in relation to $t_1$. The PM integrates signals over time durations in the nanosecond to millisecond range, typically nanoseconds for acoustic signals and microseconds to milliseconds for a thermal signal after $t_1$. Integration over longer intervals increases the signal collected but reduces the localization ability, whereby shorter time intervals increases the localization ability. The PM may use algorithmic means to identify the beginning of the collected signal, indicating a measurement from the surface of the sample measured and then compute signals on the surface, deeper than the surface or a total response of the entire tissue volume sampled. The advantage of this preferred approach (also referred as "time gating") is that by means of time differentiation, one can sample signals coming deeper from tissue, or more superficially, therefore selecting where the measurement is recorded from. As an example, for glucose measurements, the time interval can preferably be determined so that the measurements exclude responses from the very superficial layers of the epidermis, for example the stratum corneum, and instead integrate signals coming from deeper layers, for example from the stratum spinosum or, preferentially, from the capillary loop layer, therefore preferentially recording glucose in the vascular system. Since concentration of glucose in blood vessels is much higher than in interstitial fluid (by factor 100), this measurement can improve the sensitivity of detection. Moreover, by rejecting signals from the surface, the measurement becomes more accurate, as it does not integrate other contributions to the recorded signals, for example from skin conditions or impurities. By moving away from the prior art that is based on integration of bulk signals with high sensitivity to signals from the superficial skin, the deep-layer selective measurement preferably performed by a sensor disclosed herein becomes more sensitive and specific. Advantageously, time selection can be applied to any detector signal, either acoustic/ultrasound, thermal or other.

Spectral decomposition. Preferably, processing the signal(s) detected in multiple spectral components allows for a detection and location of metabolites with high specificity and precision by differentiation of spectral features among metabolites, for instance glucose and lactate. Spectral decomposition can be performed in optical, acoustic and thermal spectra preferably by applying at least one of the following:

a) Optical spectral decomposition is achieved, for example, by tuning (continuous sweeping or step-by-step) the emission wavelength of a laser with a narrow linewidth (typically 1-16 nanometers or alternatively 0.5-10 $cm^{-1}$) over a spectral range covering the mid-IR range, preferentially the fingerprint spectra of a metabolite of interest. The right indexing of the wavelengths corresponding to the detected signals is preferably achieved either by synchronization of the read-out module with the tuning mechanism of the laser or by a spectral reference element, for example the interference pattern of an etalon, installed in the beam pathway (common path) or analyzing a secondary beam derived from the main excitation beam, for instance with a beam splitter.

b) Acoustic spectral decomposition can preferably be performed for:

(i) Optical-spectral multiplexing. Due to the strong mid-infrared absorption coefficient of biological tissues, the penetration depth (which determines the depth of the irradiation voxel) ranges between 1 to 200 μm. In the lower part of the mid-IR excitation employed (1-3 micrometers) deeper penetration can also be achieved. Since the penetration depth is the inverse of the absorption coefficient, determination of the axial component of the voxel size (depth) can be used to calculate the optical absorption spectra. Additionally, the acoustic frequency response is defined by the size of the acoustic source, with high frequencies corresponding to small-size sources and low frequencies to large-size sources. In mid-infrared excitation of biological tissues, the size of the axial component of the voxel (acoustic source) is defined by the optical absorption coefficient. Acoustic decomposition for optical multiplexing can preferably be implemented as follows:

(1) Tissues are illuminated with mid-infrared radiation emitted by the ELEM tuning the emission wavelength (with a narrow linewidth of, typically, 0.5 to 10 $cm^{-1}$) along a given spectral range between 1000 nm to 16000 nm while simultaneously recording the acoustic response at each excitation wavelength by the RMD and ROM modules. The frequency content of the detected signals at each wavelength is analyzed by the PM to obtain the frequency distribution vs. tuning wavelength (for instance to determine the frequency at the maximum intensity). Using algorithmic means, the PM harvest this information to analyze the acoustic response to mid-infrared excitation at each wavelength and to calculate the optical absorption spectrum of the sample.

(2) Tissues are illuminated by a broadband emitting mid-infrared radiation from the ELEM. The acoustic response to broadband illumination, composed of contributions by all excitation wavelengths in the range, is measured by the RMD and ROM modules, here the wavelength-by-wavelength acoustic spectra analysis, explained in (i) above, can be used by the PM as reference to calculate the optical absorption spectra of the sample encoded in the acoustic signal.

(ii) Wide-field imaging, as opposite to point-by-point scanning, is preferably implemented in the following way: the sample, e.g. biological tissue, is acoustically coupled to the RMD consisting of an acoustic encoder element with a wideband acoustic response provided by a fractal resonant structure, coupled, integrated, or composing the acoustic encoder. Additionally, the acoustic encoder has the properties of (1) being at least partially transparent to mid-infrared light as well as to acoustic waves and (2) of providing different acoustic response for different locations in contact with the sample. Specifically, the spatial-acoustic response of the acoustic encoder is first characterized at each contact point with the sample. This is preferably achieved by raster scanning the focused mid-infrared excitation beam (with typical spot size between 1 to 15 μm) while simultaneously acquiring the acoustic response generated at each location by an ultra-wideband ultrasound detector. Once the acoustic response of the encoder is determined, wide illumination is applied to the sample in contact with the encoder and the acoustic signal, composed of the contributions by individual locations, is recorded and then deconvolved to form intensity maps using the spatial-acoustic response of the acoustic encoder as reference. Unlike prior art, this approach uses a fractal resonant structure to enhance and enrich the spatial-acoustic encoding range of the acoustic encoder to produce wide-field imaging using a single ultrawideband ultrasound detection element integrated to the RMD.

Preferably, combination of (i) and (ii) allows for obtaining single snap-shot widefield imaging and multiplexed optical spectroscopy by broad band mid-infrared excitation.

c) Thermal spectral decomposition, analysis and decomposition of the thermal signals generated due to mid-infrared excitation allows for a determination of the optical and thermodynamic properties of the sample preferably in the following way: narrow linewidth, typically 0.5 to 10 $cm^{-1}$, mid-infrared laser excitation at one or more wavelengths in the range between 1000 nm to 16000 nm is applied to a biological sample. Absorption of coherent pulsed mid-infrared laser energy excites vibrational transitions, energy which is subsequently re-emitted as broadband incoherent heat emission with wavelengths ranging the 1000 nm to 25000 nm, as described by black body radiation theory. Here, the thermal radiation spectra of the radiator define the temperature of the radiator according to Wien's law. Since the temperature increase of the sample due to mid-infrared excitation is proportional to the optical absorption, optical absorption properties can be calculated by analysis of the thermal radiation spectra and temperature distribution of the excited tissues. Additionally, the thermal decay profile, with thermal decay constants ranging the micro to milliseconds, is dictated by the thermodynamic properties of the tissues as well as its initial temperature (which is also proportional to optical absorption). Detection of the thermal spectra and or/temperature is implemented, for example, by a single or by an array of bolometric and/or pyroelectric detector elements. This approach, unlike prior art, is able to analyze the thermal spectra containing information from deeper layers of the excited tissues and not only the from superficial tissue layers when measuring reflected signals, as performed by prior art.

FIG. 2 shows a schematic representation of another example of a sensor device, preferably for non-invasive dimension-selective metabolic sensing by localized reflection-mode pump-and-probe detection of optoacoustic/optothermal signals, wherein the device comprises: an Encoded Light Emitting Module 1, also referred to as "ELEM", a Modulated excitation beam 2 from ELEM 1, a Light Delivery Module 3, also referred to as "LDM", a Beam combiner 4 for multiple ELEM 1 elements, an Excitation-beam/probe-beam coupler 5, an Excitation/probe-beam scanner 6, an Excitation-/probe-beam focusing unit 7, a Reflective Mode Detector 8, also referred to as "RMD", a selective probe-reflective/excitation-transmissive coating 9 of RMD 8, an optoacoustic and/or thermal field 10 produced by the excitation beam, a sample 11, in particular a biological tissue, a Read-Out Module 12, also referred to as "ROM", a Probe beam 13 from ROM 12, and a Processing Module 14, also referred to as "PM".

Preferably, a change in the physical properties of the RMD 8, due to an interaction with the optoacoustic and/or optothermal signal emitted by the sample 11 in response to an excitation with the excitation beam 2, changes at least one of the physical properties of the probe beam 13 which is measured by the ROM 12, for instance, intensity, phase, polarization, focus, spectral content, etc. The reflected probe beam 13 contains the modulation pattern of the excitation beam 2 and allows determination of the optical absorption properties on selected points and depths in the sample 11.

Preferably, one (or more) modulated excitation beam(s) (2) emitted by the ELEM 1 is (are) delivered and focused to the sample 11 by the LDM 3 and the focusing unit 7, respectively. In case of several excitation beams emitted by the ELEM 1, the beams can be combined by the beam combiner 4.

The focused excitation beam(s) 2 pass throughout the RMD element 8 irradiating the sample 11 (almost) unperturbed by the probe-beam-selective reflective coating 9.

The absorption of the excitation beam(s) 2 by the sample 11 generates an optoacoustic and/or optothermal signal on the sample 11 that is, at least partially, transmitted to the RMD 8 producing, for instance, a temperature (T)- and/or pressure (p)-dependent change of the local refractive index n (according to dn/dT and/or dn/dp of the material constituting the RMD 8) distributed in a field 10 adjacent to the inner face of the RMD 8 in direct contact with the sample 11.

A probe beam 13, which is generated by a probe beam source 12*a* of the ROM 12, is combined and/or co-aligned with the excitation beam(s) 2 by the excitation-/probe-beam coupler 5 and focused to the sample 11 by the focusing unit 7, e.g. a condenser lens or optics, passing throughout the RMD element 8.

The probe beam 13 is reflected (or mainly reflected) by the probe-beam-selective coating 9 at the inner surface of the RMD 8 directly adjacent to its face in contact with the sample 11. The change in the refractive index (or any other physical property) perturbs the reflected probe beam 13, this perturbation has the modulation and/or encoding pattern of the excitation beam(s) 2.

The modulated and/or encoded changes on the reflected beam 13 (e.g. refractive index) are measured by a probe beam detector 12*b* the ROM 12, for instance by means of interferometry, from which information of the optoacoustic and/or optothermal signals and, therefore, the optical absorption properties of the sample 11 are calculated by the PM 14.

Excitation beam(s) 2 and probe beam(s) 13 can be simultaneously scanned over the sample 11 by the excitation-/probe beam scanner 6 allowing for localization and/or selection of measuring points (also referred to as locations of interest, LOI's).

In a preferred application and/or use of the device shown in the figure, first a point for metabolic monitoring is localized by scanning the excitation beam 2 and probe beam 13 (stochastically or sequentially) over the sample 11 looking for blood-containing structures (for example microvasculature by excitation at 532 or 1064 nm) and simultaneously testing for points where mid-infrared radiation (in particular at 2.5 to 16 μm) can most efficiently reach the blood-containing structures.

The processing module 14 defines the optimal measuring point (LOI) by selection (localization) of a blood-containing structure with the lowest interference for mid-infrared delivery to that structure, for instance it determines the lateral position (x, y) and/or calculates (preferably based on time-gating and/or spectral decomposition) the depth (z) and/or size of the blood-containing structure and the thickness of the stratum corneum above it, choosing the nearest structure below the thinnest stratum corneum layer which interference can be further minimized by virtual skin-rejection based on time-gating and/or spectral decomposition.

Once a point (LOI) for metabolic sensing has been selected (localized), the device measures the mid-infrared absorption signal and/or spectrum at a lateral position (x, y) and/or depth (z) where the structure/compartment of interest is located. This is preferably done by rejection and/or correction of superficial skin layers with low metabolite content (for instance stratum corneum) using time, thermal, and/or spectral decomposition as described above. Different analytes of interest, for example glucose and/or lactate, can be selectively detected by determination of the differential optical saturation spectra produced by encoded mid-infrared excitation.

The processing module 14 calculates the concentration of the detected metabolites preferably based on the multidimensional content of the measured signals (e.g. acoustic, thermal, optical, time behavior in response to different encoding patterns) and pre-set data bases by computational algorithms, for example multi-layer neural networks.

In a preferred embodiment of the sensor device, metabolite measurements are performed using excitation radiation in the spectral range between 1 and 2.5 micrometers (μm). This spectral range is particularly advantageous because it allows measurements deeper in tissue than higher wavelengths and imparts better layer/dimension separation as a function of tissue (e.g skin) depth. In this spectral range the sensor device can reach the epi-dermal/dermal interface and dermal plexus and deliver signals from different vascular structures of the skin, including the capillary look layer and the dermal plexus itself. This performance is advantageous because metabolites can be sensed within skin layers rich in vasculature, whereby metabolite concentration is highest, over measurements at interstitial fluids. Therefore, a loss of signal strength, due to the lower absorption in this spectral range (also termed short-wavelength infrared SWIR) is compensated by the higher concentration of metabolites and the abundance of vessels in these layers. In this case LOI selection may be unnecessary, since the skin may be relatively rich in vasculature within the capillary loop layer. Nevertheless, LOI selection may be performed, in particular since the skin of patients with progressed disease may change characteristics and therefore selection improves the reliability of the measurements.

FIG. 3 shows a schematic representation of yet another example of a sensor device, in particular a sensor device for non-invasive metabolic sensing by localized detection of optothermal radiation. The sensor device preferably comprises: an Encoded Light Emitting Module 1, also referred to as "ELEM", a Modulated excitation beam 2 from ELEM 1, a Light Delivery Module 3, also referred to as "LDM", a Beam combiner 4 for multiple ELEM elements, an Excitation beam scanner 6, an Excitation beam focusing unit 7, Reflective Mode Detector 8, also referred to as "RMD", a selective excitation-transmissive/thermal radiation-reflective coating 9 of RMD 8, a sample (tissue) 11, a thermal field 10 produced by an (at least partial) absorption of the excitation beam 2 by the sample 11, optothermal radiation 16 due to excitation beam 2-sample 11 interaction, thermal radiation-selective filter 17 configured to remove stray or scattered or specular reflection radiation of the excitation beam 2, thermal radiation condensing unit 18 configured to condense and/or focus the thermal radiation 16, thermal radiation (temperature) detector 12 configured to detect the condensed and/or focused thermal radiation 16, and processing module 14, also referred to as "PM".

Optical absorption of the excitation radiation 2 by the sample (tissue) 11 changes the local temperature on the RMD 8-sample 11 interface, generating broadband thermal radiation 16 which is detected by the temperature detector 12, which preferably comprises one or more bolometric and/or pyroelectric detector elements 12*c*. Preferably, the detected thermal radiation contains the modulation pattern of the excitation beam 2 and allows for determining the optical absorption properties on selected points and depths in the sample 11. Additionally, unlike the excitation radiation 2, the optothermal radiation 16 is emitted at a broad spectral range, according to Plank's radiation law (black-body radiation).

Regarding the elements 1 to 4, 6 to 12 and 14 of the sensor device shown in FIG. 3, the above elucidations with respect to the sensor device shown in FIG. 2 apply accordingly.

FIG. 4 shows a schematic representation of yet another example of a sensor device, in particular a sensor device for non-invasive dimension-selective metabolic sensing by localized reflection-mode pump-and-probe detection of optoacoustic/optothermal signal with dual probe-beam noise suppression. The sensor device preferably comprises: an Encoded Light Emitting Module 1, also referred to as "ELEM"; a Modulated excitation beam 2 from ELEM; a Light Delivery Module 3, also referred to as "LDM"; a Beam combiner 4 for multiple ELEM elements; an Excitation-beam/probe-beam coupler 5; an Excitation-/probe-beams scanner 6; a Reflective Mode Detector 8, also referred to as "RMD"; a selective probe-reflective/excitation-transmissive coating 9 of RMD; an optoacoustic/thermal field 10 produced by the excitation beam; a sample 11; a probe-beam emitting unit 12*a* of the Read-Out Module, ROM; a probe-beam encoding unit 12*b* of the Read-Out Module, ROM; a probe-beam decoder 12*c* of the Read-Out Module, ROM; a Probe beam 13*a* from ROM; an encoded reference probe beam 13*b* from ROM, also referred to as "RB"; an encoded sample probe beam 13*c* (also referred to as "active probe beam") from ROM, also referred to as "SB"; a readout beam 13*d* (also referred to as "recombined beam") from ROM; Processing Module 14, also referred to as "PM".

One (or more) modulated excitation beam(s) 2 emitted by the ELEM 1 is (are) delivered to the sample 11 by the LDM 3. In case of several excitation beams 2 emitted by the ELEM, the beams can be combined by the beam combiner 4. The excitation beam(s) 2 pass throughout the RMD element 8 irradiating the sample 11 (almost) unperturbed by the probe-beam-selective reflective coating 9.

The absorption of the excitation beam(s) 2 by the sample 11 generates an optoacoustic and/or optothermal signal on the sample 11 that is, at least, partially transmitted to the RMD producing, for instance, a change of local refractive index (according to dn/dt and/or dn/dp of the material constituting the RMD) distributed in a field 10 adjacent to the inner face of the RMD 8 in direct contact with the sample 11. A probe beam 13*a* from the ROM probe-emitting unit 12*a* is divided in two parallel beams 13*b* and 13*c* by the probe-beam encoding unit 12*b* each having a distinctive encoding pattern (for instance, polarization orientation). One of the beams 13*c* (termed sample beam, "SB") in this example, is combined/co-aligned with the excitation beam(s) 2 by the excitation-/probe-beam coupler 5 and directed to the sample throughout the RMD element 8, where both SB 13*c* and excitation beam 2 are co-aligned to irradiate the same area on the sample 11. The second beam 13*b* (termed reference beam, "RB") in this example, is directed to the sample 11 throughout the RMD element 8 irradiating on a region on the sample 11 with no excitation beam 2 irradiation. The differentially encoded probe beams (SB and RB) are reflected (or mainly reflected) by the probe-beam-selective coating 9 at the inner surface of the RMD 8 directly adjacent to its face in contact with the sample 11. The (local) change in the refractive index (or any other physical property) of the RMD element 8 due to the action of the excitation beam(s) 2 perturbs the reflected sample probe beam SB 13*c*, this perturbation has the modulation/encoding pattern of the excitation beam(s) 2, while the reflected probe beam RB 13*b* remains unaffected by the thermal field 10 and it is used as reference for noise compensation/suppression from sources other than due to the action of the excitation beam 2.

The modulated/encoded changes on the reflected sample probe beam 13*c* due to, for instance, refractive index change on the RMD 8, are recombined with the reflected reference probe beam 13*b* generating the read-out beam ROB 13*d* which is selectively detected by the probe-beam decoder 12*c* of the ROM.

Preferably, the probe-beam encoding unit 12*b* recombines, in particular by interference, the active probe beam 13*c* and the reference probe beam 13*b*, after having been reflected at or by the at least one sensitive element 8, wherein recombined probe beam 13*d* is obtained, which is detected to generate the probe beam signals 12*d*.

Alternatively or additionally, the active probe beam (13*c*) and the reference probe beam (13*b*), after having been reflected at or by the at least one sensitive element (8), can be detected separately, e.g. by two separate detectors (not shown), and probe beam signals 12*d* can be derived based on the separately detected active probe beam 13*c* and reference probe beam 13*b*, e.g. by subtracting and/or dividing the corresponding active probe beam signals and reference probe beam signals.

In one preferred implementation, SB 13*c* and RB 13*b* are encoded in such a way that each beam has orthogonally oriented polarizations and recombined in such a way as to generate circularly/elliptically polarized light with varying phase retardation modulated by the excitation beam; from which information of the optoacoustic/optothermal signals and, therefore, the optical absorption properties of the sample are calculated by the PM 14. Excitation and probe beams can be simultaneously scanned over the sample by the excitation-/probe beam scanner 6 allowing for localization/selection of measuring points.

Preferably, when using a sensor device and/or applying a method according to present disclosure, first a point for metabolic monitoring is localized and/or selected by scanning the excitation and probe beam (stochastically or sequentially) over the sample looking for blood-containing structures (for example microvasculature by excitation at 532 or 1064 nm) and simultaneously testing for points where mid-infrared radiation (2.5 to 16 μm) can most efficiently reach the blood-containing structures. Preferably, the processing module defines an optimal measuring point by localization and/or selection of a blood-containing structure with the lowest interference for mid-infrared delivery to that structure; for instance (based on time-gating and/or spectral decomposition) it calculates the lateral (x, y) position and/or depth (z)/size of the blood-containing structure and the thickness of the stratum corneum above it, choosing the shallowest structure below the thinnest stratum corneum layer. Then, once a point for metabolic sensing has been localized and/or selected, the device measures the mid-infrared absorption signal/spectrum at a lateral position and/or depth where the structure/compartment of interest is located. This is preferably done by rejection and/or correction of superficial skin layers with low metabolite content (for instance stratum corneum) using time-gating, thermal, and/or spectral decomposition. Different analytes of interest, for example glucose and/or lactate, can selectively detected by determination of the differential optical saturation spectra produced by encoded mid-infrared excitation. The processing module preferably calculates the concentration of the detected metabolites using the multidimensional content of the measured signals (e.g. acoustic, thermal, optical, time behavior to different encoding patterns) and pre-set data bases by computational algorithms, for example multi-layer neural networks.

The invention claimed is:

1. A device for determining one or more parameters regarding a content or property of biomolecules, in particular metabolites, in a biological tissue, the device comprising at least one irradiation unit configured to irradiate the tissue with electromagnetic radiation exhibiting one or more wavelengths or wavelength ranges, in particular in the mid-infrared, near-infrared or visible spectral range, at least one detection unit configured to detect, in a spatially resolved manner, first signals corresponding to optical, optoacoustic, or optothermal signals emanating from the tissue in response to irradiating the tissue with electromagnetic radiation, in particular in the near-infrared or visible spectral range, wherein the at least one irradiation unit and the at least one detection unit are located in the same half space above or adjacent to the irradiated tissue, and a processing unit configured i) to localize, based on the detected first signals, a location or region of interest on or within the tissue, at which at least one biomolecule, in particular metabolite, of interest is present or expected to be present, ii) to control the at least one irradiation unit to irradiate the localized location or region of interest on or within the tissue with electromagnetic radiation exhibiting a time-varying intensity and one or more wavelengths or wavelength ranges in the mid-infrared spectral range, iii) to control the at least one detection unit to detect second signals corresponding to optoacoustic or optothermal signals emanating from the irradiated location or region of interest on or within the tissue in response to irradiating the location or region of interest on or within the tissue with the electromagnetic radiation in the mid-infrared spectral range, and iv) to determine, based on the detected second signals, one or more parameters regarding a content or property of the at least one biomolecule of interest at the location or region of interest on or within in the tissue.

2. The device according to claim 1, wherein the device is designed as or integrated in a portable or wearable device having a size, weight or form factor allowing the device to be carried or worn by a person.

3. The device according to claim 1, wherein the device is configured for non-invasively determining the one or more parameters regarding the content or property of biomolecules, in particular metabolites, in the biological tissue.

4. The device according to claim 1, wherein the at least one detection unit comprises at least one sensitive element located so as to be close to or in contact with the tissue and configured to change at least one of its properties, in particular refractive index, temperature, reflectivity or polarizing properties, when interacting with the first signals or second signals emanating from the irradiated tissue or, respectively, from the irradiated location or region of interest on or within the tissue, a probe beam source configured to generate a probe beam, a probe beam guide unit configured to guide or direct the probe beam towards the at least one sensitive element, and a probe beam detector configured to detect the probe beam after it has been at least partially reflected at or by the at least one sensitive element, wherein the detected probe beam corresponds to the first signals or second signals, respectively.

5. The device according to claim 4, wherein the probe beam guide unit comprises a coupler element configured to combine or co-align the probe beam with at least one beam of the electromagnetic radiation, with which the tissue is irradiated, so that the probe beam and the at least one beam of the electromagnetic radiation impinge on the same, or essentially the same, location on the tissue.

6. The device according to claim 1, wherein the at least one detection unit comprises at least one sensitive element located so as to be close to or in contact with the tissue and configured to change at least one of its properties, in particular refractive index, temperature, reflectivity or polarizing properties, when interacting with the first signals or second signals emanating from the irradiated tissue or, respectively, from the irradiated location or region of interest on or within the tissue, a probe beam source configured to generate a probe beam, a probe beam encoding/decoding unit configured to encode and divide the probe beam into a reference probe beam and an active probe beam, and to generate probe beam signals based on the active probe beam and the reference probe beam after having been at least partially reflected at or by the at least one sensitive element, and a probe beam guide unit configured to guide or direct the active probe beam and the reference probe beam towards the at least one sensitive element, wherein the probe beam guide unit comprises a coupler element configured i) to combine or co-align the active probe beam with at least one beam of the electromagnetic radiation, with which the tissue is irradiated, so that the active probe beam and the at least one beam of the electromagnetic radiation impinge on the same, or essentially the same, location on the tissue, and ii) to direct, in particular deflect or reflect, the reference probe beam to impinge on another location on the tissue, which is different or offset from the location on which the probe beam and the at least one beam of the electromagnetic radiation impinge, wherein the processing unit is configured to derive the first signals or second signals, respectively, from the probe beam signals.

7. The device according to claim 6, wherein the probe beam encoding/decoding unit is configured to divide the probe beam into the active probe beam and the reference probe beam and to encode the active probe beam and reference probe beam with respect to at least one physical property, in particular polarization direction or pattern, pulse duration, pulse repetition rate, intensity modulation or linewidth modulation, such that each of the active probe beam and reference probe beam has a distinctive encoding pattern, and to recombine, in particular by interference, the active probe beam and the reference probe beam, after having been reflected at or by the at least one sensitive element, to obtain a recombined probe beam and to detect the recombined probe beam to generate the probe beam signals, or to separately detect the active probe beam and the reference probe beam, after having been reflected at or by the at least one sensitive element, and to derive the probe beam signals based on, in particular by subtracting or dividing, the detected active probe beam and the detected reference probe beam.

8. The device according to claim 1, comprising at least one mid-infrared light guide element configured to guide the electromagnetic radiation exhibiting one or more wavelengths or wavelength ranges in the mid-infrared spectral range from the at least one irradiation unit to the location or region of interest on or within the tissue, wherein the mid-infrared light guide element comprises a solid body which is entirely or at least partially composed of at least one mid-infrared transparent material, in particular ZnS, ZnSe, $CaF_2$, Ge, Si.

9. The device according to claim 1, wherein the at least one irradiation unit is configured to irradiate the tissue with at least two different types of electromagnetic radiation so as to obtain, for each of the at least two different types of electromagnetic radiation, unique optoacoustic or optothermal signals in response to irradiating the tissue with the at least two types of electromagnetic radiation, wherein each of the obtained optoacoustic or optothermal signals can be uniquely assigned to one of the at least two types of electromagnetic radiation by which the respective optoacoustic or optothermal signal has been caused.

10. The device according to claim 9, wherein the at least two different types of electromagnetic radiation differ from each other or are encoded with respect to at least one of the following properties of the electromagnetic radiation: polarization, pulse duration, pulse repetition rate, intensity modulation or linewidth modulation of the electromagnetic radiation.

11. The device according to claim 1, wherein the processing unit is configured to select, from the detected second signals, those second signals, which emanate from the location or region of interest on or within the tissue, and to determine, based on the selected second signals, the one or more parameters regarding the content or property of the at least one biomolecule of interest at the location or region of interest on or within in the tissue.

12. The device according to claim 1, wherein the at least one detection unit is configured to detect the second signals in a temporally resolved manner so as to obtain a series of second signals over time, and wherein the processing unit is configured to select second signals, which were detected at a particular time or during a particular time range and generated at the location of interest or within the region of interest, respectively, from the series of second signals, and to determine, based on the selected second signals, the one or more parameters regarding the content or property of the at least one biomolecule of interest at the location or region of interest on or within in the tissue.

13. The device according to claim 12, wherein the processing unit is configured to sum up or integrate the selected second signals, which were detected during a particular time range and generated within the region of interest, and to determine, based on the summed up or integrated selected second signals, the one or more parameters regarding the content or property of the at least one biomolecule of interest at the region of interest on or within in the tissue.

14. The device according to claim 1, wherein the at least one irradiation unit is configured to subsequently irradiate the location or region of interest on or within the tissue with electromagnetic radiation at different wavelengths or wavelength ranges in the mid-infrared spectral range, the at least one detection unit is configured to subsequently detect second signals corresponding to optoacoustic signals emanating from the irradiated location or region of interest on or within the tissue in response to subsequently irradiating the tissue with the electromagnetic radiation at the different wavelengths or wavelength ranges, respectively, and the processing unit is configured to determine, based on the subsequently detected second signals, an optical absorption spectrum of the location or region of interest on or within the tissue.

15. The device according to claim 1, wherein the at least one irradiation unit is configured to simultaneously irradiate the location or region of interest on or within the tissue with electromagnetic radiation at different wavelengths or wavelength ranges in the mid-infrared spectral range, the at least one detection unit is configured to simultaneously detect second signals corresponding to optoacoustic signals emanating from the irradiated location or region of interest on or within the tissue in response to simultaneously irradiating the tissue with the electromagnetic radiation at the different wavelengths or wavelength ranges, respectively, and the processing unit is configured to determine, based on the simultaneously detected second signals, an optical absorption spectrum of the location or region of interest on or within the tissue.

16. The device according to claim 1, wherein the at least one irradiation unit is configured to subsequently irradiate the location or region of interest on or within the tissue with coherent electromagnetic radiation at different wavelengths or wavelength ranges in the mid-infrared spectral range, the at least one detection unit is configured to subsequently detect second signals corresponding to incoherent optothermal signals emanating from the irradiated location or region of interest on or within the tissue in response to subsequently irradiating the tissue with the coherent electromagnetic radiation at the different wavelengths or wavelength ranges, respectively, wherein the at least one detection unit in particular comprises one or more bolometric or pyroelectric detector elements which are configured to detect thermal radiation, temperature, or temperature changes, and the processing unit is configured to determine, based on the subsequently detected second signals, at least one optical absorption property or thermodynamic property of the location or region of interest on or within the tissue.

17. The device according to claim 16, the device further comprising an optical element provided between the at least one irradiation unit and the tissue and configured to transmit the coherent electromagnetic radiation to the tissue so as to irradiate the location or region of interest on or within the tissue with the coherent electromagnetic radiation, and to direct or reflect at least a part of the second signals corresponding to incoherent optothermal radiation signals emanating from the irradiated location or region of interest on or within the tissue towards the at least one detection unit.

18. A method for determining one or more parameters regarding a content or property of biomolecules, in particular metabolites, in a biological tissue, the method comprising the following steps:

irradiating the tissue with electromagnetic radiation exhibiting one or more wavelengths or wavelength ranges, in particular in the near-infrared or visible spectral range, detecting, in a spatially resolved manner, first signals corresponding to optical, optoacoustic, or optothermal signals emanating from the tissue in response to irradiating the tissue with the electromagnetic radiation, localizing, based on the detected first signals, a location or region of interest on or within the tissue, at which at least one biomolecule of interest is present or expected to be present, irradiating the localized location or region of interest on or within the tissue with electromagnetic radiation exhibiting a time-varying intensity and one or more wavelengths or wavelength ranges in the mid-infrared spectral range, detecting second signals corresponding to optoacoustic or optothermal signals emanating from the irradiated location or region of interest on or within the tissue in response to irradiating the location or region of interest on or within the tissue with the electromagnetic radiation in the mid-infrared spectral range, and determining, based on the detected second signals, one or more parameters regarding a content or property of the at least one biomolecule, in particular metabolite, of interest at the location or region of interest on or within in the tissue.

* * * * *